(12) United States Patent
Yi et al.

(10) Patent No.: US 10,383,160 B2
(45) Date of Patent: Aug. 13, 2019

(54) DATA PROCESSING METHOD, APPARATUS, AND DEVICE

(71) Applicant: Huawei Technologies Co., Ltd., Shenzhen (CN)

(72) Inventors: Qiang Yi, Beijing (CN); Guowei Ouyang, Beijing (CN); Hui Jin, Beijing (CN); Yue He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 15/720,660

(22) Filed: Sep. 29, 2017

(65) Prior Publication Data

US 2018/0027602 A1 Jan. 25, 2018

Related U.S. Application Data

(63) Continuation of application No. PCT/CN2015/090834, filed on Sep. 25, 2015.

(30) Foreign Application Priority Data

Mar. 31, 2015 (WO) ................ PCT/CN2015/075584

(51) Int. Cl.
*H04L 5/14* (2006.01)
*H04L 29/06* (2006.01)
(Continued)

(52) U.S. Cl.
CPC ....... *H04W 76/14* (2018.02); *H04L 29/08423* (2013.01); *H04L 67/1068* (2013.01);
(Continued)

(58) Field of Classification Search
CPC .... H04W 76/14; H04W 92/18; H04L 67/1068
See application file for complete search history.

(56) References Cited

U.S. PATENT DOCUMENTS 5,852,747 A * 12/1998 Bennett ............... G06F 16/1774
710/40
8,260,266 B1 9/2012 Amidon et al.
(Continued)

FOREIGN PATENT DOCUMENTS

CN 101350914 A 1/2009
CN 101663653 A 3/2010
(Continued)

OTHER PUBLICATIONS

3rd Generation Partnership Project;Technical Specification Group Services and System Aspects; Study on extended architecture support for proximity-based services (Release 13), 3GPP TR 23.713 V1.0.0 (Feb. 2015), 59 pages.
(Continued)

*Primary Examiner* — Brian S Roberts
*Assistant Examiner* — Abusayeed M Haque
(74) *Attorney, Agent, or Firm* — Slater Matsil, LLP

(57) ABSTRACT

The present disclosure discloses a data processing method, apparatus, and device. The method includes: sending, by a user equipment UE, updated metadata; obtaining a metadata index value corresponding to the updated metadata; and broadcasting, by the UE, the obtained metadata index value.

15 Claims, 14 Drawing Sheets

(51) Int. Cl.
*H04L 12/801* (2013.01)
*H04W 76/14* (2018.01)
*H04L 29/08* (2006.01)
*H04W 8/00* (2009.01)
*H04W 92/18* (2009.01)

(52) U.S. Cl.
CPC ............. *H04L 67/34* (2013.01); *H04W 8/005* (2013.01); *H04W 92/18* (2013.01)

(56) References Cited

U.S. PATENT DOCUMENTS

| | | | |
|---|---|---|---|
| 2009/0094253 | A1 | 4/2009 | Hanai |
| 2009/0254632 | A1 | 10/2009 | Kannan et al. |
| 2010/0100615 | A1* | 4/2010 | Lee ..................... G06Q 30/02 709/223 |
| 2010/0174680 | A1 | 7/2010 | Yamagishi et al. |
| 2013/0023317 | A1 | 1/2013 | Snow et al. |
| 2013/0103642 | A1* | 4/2013 | Zhang ..................... H04L 67/02 707/609 |
| 2013/0185266 | A1* | 7/2013 | Horn ..................... G06F 16/113 707/691 |
| 2014/0010179 | A1 | 1/2014 | Lee |
| 2014/0074783 | A1* | 3/2014 | Alsina ..................... G06Q 10/10 707/624 |
| 2014/0201187 | A1* | 7/2014 | Larson ................ G06F 16/2228 707/711 |
| 2014/0274031 | A1* | 9/2014 | Menendez ........ H04W 52/0209 455/426.1 |
| 2015/0017917 | A1 | 1/2015 | Guo et al. |
| 2015/0281763 | A1* | 10/2015 | Bertrand ............. H04N 21/235 725/32 |
| 2016/0007185 | A1 | 1/2016 | Zhu et al. |

FOREIGN PATENT DOCUMENTS

| | | |
|---|---|---|
| CN | 102016847 A | 4/2011 |
| CN | 102291373 A | 12/2011 |
| CN | 103379469 A | 10/2013 |
| CN | 103716390 A | 4/2014 |
| CN | 104066070 A | 9/2014 |
| CN | 104412624 A | 3/2015 |
| CN | 104469961 A | 3/2015 |
| WO | 2013112953 A1 | 8/2013 |
| WO | 2016044448 A1 | 3/2016 |

OTHER PUBLICATIONS

3rd Generation Partnership Project;Technical Specification Group Services and System Aspects;Proximity-based services (ProSe); Stage 2 (Release 12), 3GPP TS 23.303 V12.4.0 (Mar. 2015), 63 pages.

3rd Generation Partnership Project;Technical Specification Group Core Network and Terminals; Proximity-services (ProSe) User Equipment (UE) to ProSe function protocol aspects; Stage 3 (Release 12), 3GPP TS 24.334 V12.2.0 (Mar. 2015), 92 pages.

Qualcomm Inc., "Metadata upload for Open and Restricted Discovery," SA WG2 Meeting #107, S2-150116, Sorrento, Italy, Jan. 26-30, 2015, 10 pages.

Qualcomm Incorporated, "Direct discovery procedures," SA WG2 Meeting #101, S2-140520, Taipei, Taiwan, Jan. 20-24, 2014, pp. 1-23.

3rd Generation Partnership Project;Technical Specification Group Services and System Aspects; Study on architecture enhancements to support Proximity-based Services (ProSe) (Release 12), 3GPP TR 23.703 V12.0.0 (Feb. 2014), 324 pages.

* cited by examiner

DATA PROCESSING METHOD, APPARATUS, AND DEVICE

CROSS-REFERENCE TO RELATED APPLICATIONS

This application is a continuation of International Application No. PCT/CN2015/090834, filed on Sep. 25, 2015, which claims priority to International Application No. PCT/CN2015/075584, filed on Mar. 31, 2015. The disclosures of the aforementioned applications are hereby incorporated by reference in their entireties.

TECHNICAL FIELD

The present disclosure relates to the field of communications technologies, and in particular, to a data processing method, apparatus, and device.

BACKGROUND

In a conventional Long Term Evolution (LTE) communications system, a data transmission path between user equipments (UE) needs to pass through an access network entity (for example, a base station (eNodeB)), a core network entity (for example, a serving gateway (SGW) or a packet data network gateway (PDN Gateway)), and the like. Even if data needs to be transmitted between two UEs that are close to each other, data transmitted also needs to pass through the foregoing network entities. Therefore, a large network transmission bandwidth is required, and data transmission efficiency is low. In view of this, a proximity service is proposed.

The proximity service means that two UEs that are close to each other can perform mutual discovery and perform direct communication. The proximity service has high data transmission efficiency, and therefore has many functions. For example, by using a proximity service discovery function, a user can discover a corresponding service provided by a nearby restaurant, cinema, bar, or the like.

In specific implementation of the proximity service discovery function, a party that performs active monitoring is referred to as a monitoring UE, and correspondingly, a party that is discovered or monitored is referred to as a discovered UE or a monitored UE or an announcing UE. In the proximity service, a UE may be a monitoring UE, or may be an announcing UE. A processing procedure of the proximity service discovery function is as follows:

Firstly, the monitoring UE sends an acquisition request for obtaining a discovery filter to a network side, and receives a response message returned by the network side, thereby obtaining the discovery filter.

Secondly, the announcing UE broadcasts a proximity service application code (ProSe application code).

Thirdly, based on the obtained discovery filter, the monitoring UE monitors the ProSe application code broadcast by the announcing UE, and therefore can obtain the ProSe application code broadcast by the announcing UE.

Then, when the monitoring UE obtains the ProSe application code broadcast by the announcing UE, the monitoring UE sends, to the network side, a match report message that is used to obtain a service application identity corresponding to the obtained ProSe application code and related information.

Finally, when the network side receives the match report message, the network side sends, to the monitoring UE, the service application identity corresponding to the ProSe application code, and service data.

During implementation of the proximity service discovery function, some service data completely keeps unchanged, but some service data is updated continuously. For the continuously updated service data, after the monitoring UE obtains, according to the obtained ProSe application code broadcast by the announcing UE, the service data provided by the announcing UE, the monitoring UE cannot learn, according to the foregoing data processing procedure, the updated service data provided by the announcing UE.

SUMMARY

The present disclosure provides a data processing method, apparatus, and device, used to resolve a problem that when service data is updated, a monitoring UE cannot accurately and effectively obtain updated service data provided by an announcing UE.

According to a first aspect, a data processing method is provided. The method includes sending, by a user equipment UE, updated metadata, obtaining a metadata index value corresponding to the updated metadata, and broadcasting, by the UE, the obtained metadata index value.

In a first possible implementation manner of the first aspect, before the broadcasting, by the UE, the obtained metadata index value, the method further includes: obtaining a code word for broadcasting; and the broadcasting, by the UE, the obtained metadata index value, includes: broadcasting, by the UE, the code word and the metadata index value that are obtained.

With reference to the first aspect or the first possible implementation manner of the first aspect, in a second possible implementation manner of the first aspect, the sending, by a UE, updated metadata, includes: sending, by the UE, a request message, where the request message includes the updated metadata, and the request message is used for metadata updating; and obtaining the code word and the metadata index value corresponding to the updated metadata includes: receiving, by the UE, a response message; and obtaining the code word and the metadata index value from the response message, where the code word is a code word same as one of code words stored by a network side, and the metadata index value corresponding to the updated metadata is a metadata index value generated by the network side and corresponding to the updated metadata.

With reference to the first aspect to the second possible implementation manner of the first aspect, in a third possible implementation manner of the first aspect, sending, by the UE, updated metadata of a service application in the UE, includes: sending, by the UE, a request message, where the request message includes the updated metadata, and the request message is used to request to obtain the code word for broadcasting; and obtaining the code word and the metadata index value corresponding to the updated metadata includes: receiving, by the UE, a response message; and obtaining the code word and the metadata index value from the response message, where the code word is a code word allocated by a network side to the UE, and the metadata index value corresponding to the updated metadata is a metadata index value generated by the network side and corresponding to the updated metadata.

According to a second aspect, a data processing method is provided. The method includes receiving updated metadata sent by a user equipment UE, generating a metadata index value corresponding to the updated metadata, and sending the metadata index value to the UE.

In a first possible implementation manner of the second aspect, before the sending the metadata index value to the UE, the method further includes: determining a code word for broadcasting by the UE; and the sending the metadata index value to the UE includes: sending the code word and the metadata index value to the UE.

With reference to the second aspect or the first possible implementation manner of the first aspect, in a second possible implementation manner of the second aspect, the receiving updated metadata sent by a UE includes: receiving a request message that is sent by the UE and used for metadata updating, where the request message includes the updated metadata; the determining a code word for broadcasting by the UE includes: obtaining stored code words; and the sending the code word and the metadata index value to the UE includes: sending a response message, where the response message includes a code word same as one of the stored code words and the metadata index value corresponding to the updated metadata.

With reference to the second aspect to the second possible implementation manner of the second aspect, in a third possible implementation manner of the second aspect, the receiving updated metadata sent by a UE includes: receiving a request message sent by the UE, where the request message includes the updated metadata, and the request message is used to request to obtain the code word for broadcasting; the determining a code word for broadcasting by the UE includes: allocating the code word to the UE; and the sending the code word and the metadata index value to the UE includes: sending a response message, where the response message includes the allocated code word and the metadata index value corresponding to the updated metadata.

According to a third aspect, a data processing method is provided. The method includes: sending, by a user equipment UE, updated metadata, obtaining a code word for broadcasting, where the code word includes a metadata index value corresponding to the updated metadata, and broadcasting the obtained code word.

In a first possible implementation manner of the third aspect, the sending, by a UE, updated metadata, includes: sending, by the UE, a request message, where the request message includes the updated metadata, and the request message is used for metadata updating; and the obtaining a code word for broadcasting includes: receiving, by the UE, a response message; and obtaining, from the response message, the code word for broadcasting, where the code word is generated by a network side after the network side generates the metadata index value according to the received updated metadata and replaces a metadata index value in a stored code word with the generated metadata index value.

With reference to the third aspect or the first possible implementation manner of the third aspect, in a second possible implementation manner of the third aspect, the sending, by a UE, the updated metadata, includes: sending, by the UE, a request message, where the request message includes the updated metadata, and the request message is used to request to obtain the code word for broadcasting; and the obtaining the code word for broadcasting includes: receiving, by the UE, a response message; and obtaining, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

According to a fourth aspect, a data processing method is provided. The method includes receiving updated metadata sent by a user equipment UE, generating a metadata index value corresponding to the updated metadata, generating, by using the metadata index value, a code word for broadcasting by the UE, and sending the generated code word.

In a first possible implementation manner of the fourth aspect, the receiving updated metadata sent by a UE includes: receiving a request message that is sent by the UE and used for metadata updating, where the request message includes the updated metadata; the generating, by using the metadata index value, a code word for broadcasting by the UE, includes: obtaining a stored code word for broadcasting by the UE; and replacing a metadata index value in the obtained code word with the metadata index value, and generating the code word for broadcasting by the UE; and the sending the generated code word includes: sending a response message, where the response message includes the generated code word.

With reference to the fourth aspect or the first possible implementation manner of the fourth aspect, in a second possible implementation manner of the fourth aspect, the receiving updated metadata sent by a UE includes: receiving a request message sent by the UE, where the request message includes the updated metadata, and the request message is used to request to obtain the code word for broadcasting; the generating, by using the metadata index value, a code word for broadcasting by the UE, includes: allocating, to the UE, a temporary identity in the code word for broadcasting, and generating, by using the metadata index value and the temporary identity, the code word for broadcasting by the UE; and the sending the generated code word includes: sending a response message, where the response message includes the generated code word.

According to a fifth aspect, a data processing method is provided. The method includes when a user equipment UE needs to update metadata, generating, by the UE, a metadata index value corresponding to the updated metadata. The method also includes sending the updated metadata and the metadata index value. The method also includes obtaining a code word for broadcasting. The method also includes broadcasting the obtained code word, where the code word includes the metadata index value.

In a first possible implementation manner of the fifth aspect, the sending the updated metadata and the metadata index value includes: sending, by the UE, a request message, where the request message includes the updated metadata and the metadata index value, and the request message is used for metadata updating; and the obtaining a code word for broadcasting includes: receiving, by the UE, a response message; and obtaining the code word from the received response message, where the code word is generated by a network side by replacing a metadata index value in a stored code word with the metadata index value in the request message.

With reference to the fifth aspect or the first possible implementation manner of the fifth aspect, in a second possible implementation manner of the fifth aspect, the sending the updated metadata and the metadata index value includes: sending, by the UE, a request message, where the request message includes the updated metadata and the metadata index value, and the request message is used to request to obtain the code word for broadcasting; and the obtaining a code word for broadcasting includes: receiving, by the UE, a response message; and obtaining the code word from the received response message, where the code word is generated by a network side by using the metadata index value in the request message and a temporary identity after the network side allocates, to the UE, the temporary identity in the code word for broadcasting.

According to a sixth aspect, a data processing method is provided. The method includes receiving updated metadata and a metadata index value corresponding to the updated metadata that are sent by a user equipment UE, where the metadata index value is a metadata index value corresponding to the updated metadata and generated by the UE when the UE needs to update metadata. The method also includes generating, by using the received metadata index value, a code word for broadcasting by the UE; and sending the generated code word.

In a first possible implementation manner of the sixth aspect, the receiving updated metadata and a metadata index value corresponding to the updated metadata that are sent by a UE includes: receiving a request message sent by the UE, where the request message includes the updated metadata and the metadata index value, and the request message is used for metadata updating; the generating, by using the received metadata index value, a code word for broadcasting by the UE, includes: determining a stored code word of the UE; and replacing a metadata index value in the stored code word with the received metadata index value, and generating the code word for broadcasting by the UE; and the sending the generated code word includes: sending a response message, where the response message includes the generated code word.

With reference to the sixth aspect or the first possible implementation manner of the sixth aspect, in a second possible implementation manner of the sixth aspect, the receiving updated metadata and a metadata index value corresponding to the updated metadata that are sent by a UE includes: receiving a request message sent by the UE, where the request message includes the updated metadata and the metadata index value, and the request message is used to request to obtain the code word for broadcasting; the generating, by using the received metadata index value, a code word for broadcasting by the UE, includes: allocating, to the UE, a temporary identity in the code word for broadcasting, and generating, by using the metadata index value in the request message and the temporary identity, the code word for broadcasting by the UE; and the sending the generated code word includes: sending a response message, where the response message includes the generated code word.

According to a seventh aspect, a data processing method is provided. The method includes, when a user equipment UE needs to update metadata, sending, by the UE, updated metadata, generating, by the UE, a metadata index value corresponding to the updated metadata. The method also includes obtaining a code word for broadcasting; and broadcasting the obtained code word and the generated metadata index value.

According to an eighth aspect, a data processing method is provided. The method includes, when a user equipment UE needs to update metadata, generating, by the UE, a metadata index value corresponding to the updated metadata. The method also includes sending the updated metadata and the metadata index value. The method also includes obtaining a code word for broadcasting. The method also includes broadcasting the obtained code word and the metadata index value.

In a first possible implementation manner of the eighth aspect, the sending the updated metadata and the metadata index value includes: sending, by the UE, a request message, where the request message includes the updated metadata and the metadata index value, and the request message is used for metadata updating; and the obtaining a code word for broadcasting includes: receiving, by the UE, a response message; and obtaining, from the received response message, the code word for broadcasting, where the code word is a code word same as one of code words stored by a network side.

With reference to the eighth aspect or the first possible implementation manner of the eighth aspect, in a second possible implementation manner of the eighth aspect, the sending the updated metadata and the metadata index value includes: sending, by the UE, a request message, where the request message includes the updated metadata and the metadata index value, and the request message is used to request to obtain the code word for broadcasting; and the obtaining a code word for broadcasting includes: receiving, by the UE, a response message; and obtaining, from the received response message, the code word for broadcasting, where the code word is a code word allocated by a network side to the UE.

According to a ninth aspect, a data processing method is provided. The method includes: receiving updated metadata and a metadata index value corresponding to the updated metadata that are sent by a user equipment UE, where the metadata index value is a metadata index value corresponding to the updated metadata and generated by the UE when the UE needs to update metadata. The method also includes determining a code word for broadcasting by the UE, and sending the determined code word.

With reference to the ninth aspect, in a first possible implementation manner of the ninth aspect, the receiving updated metadata and a metadata index value corresponding to the updated metadata that are sent by a UE includes: receiving a request message sent by the UE, where the request message includes the updated metadata and the metadata index value, and the request message is used for metadata updating; the determining a code word for broadcasting by the UE includes: obtaining stored code words for broadcasting by the UE; and the sending the determined code word includes: sending a response message, where the response message includes a code word same as one of the stored code words that are obtained.

With reference to the ninth aspect or the first possible implementation manner of the ninth aspect, in a second possible implementation manner of the ninth aspect, the receiving updated metadata and a metadata index value corresponding to the updated metadata that are sent by a UE includes: receiving a request message sent by the UE, where the request message includes the updated metadata and the metadata index value, and the request message is used to request to obtain the code word for broadcasting; the determining a code word for broadcasting by the UE includes: allocating the code word to the UE; and the sending the determined code word includes: sending a response message, where the response message includes the allocated code word.

According to a tenth aspect, a data processing method is provided. The method includes: monitoring and obtaining, by a UE, a code word and a metadata index value. The method also includes, when determining that the obtained code word is a discovered code word, determining, by the UE, whether the obtained metadata index value is the same as a stored metadata index value. The method also includes, if the obtained metadata index value is different from the stored metadata index value, sending, by the UE, a match report message, where the match report message includes the metadata index value. The method also includes receiving, by the UE, a match report response message. The method also includes obtaining, from the match report response message, metadata corresponding to the metadata index value.

With reference to the tenth aspect, in a first possible implementation manner of the tenth aspect, the method further includes: storing, by the UE, the obtained metadata index value.

According to an eleventh aspect, a data processing method is provided. The method includes: monitoring and obtaining, by a user equipment UE, a first code word of a proximity service. The method also includes determining whether a second code word is stored, where all parts of the second code word except a metadata index value are the same as all parts of the first code word except a metadata index value, and if a determining result is yes, deleting the second code word and a stored service application identity corresponding to the second code word.

According to a twelfth aspect, a data processing apparatus is provided. The apparatus includes: a sending module, configured to send updated metadata. The apparatus also includes an obtaining module, configured to obtain a metadata index value corresponding to the updated metadata transmitted by the sending module. The apparatus also includes a broadcasting module, configured to broadcast the metadata index value obtained and transmitted by the obtaining module.

In a first possible implementation manner of the twelfth aspect, the obtaining module is further configured to obtain a code word for broadcasting; and the broadcasting module is specifically configured to broadcast the code word and the metadata index value that are obtained.

With reference to the twelfth aspect or the first possible implementation manner of the twelfth aspect, in a second possible implementation manner of the twelfth aspect, the sending module is specifically configured to send a request message, where the request message includes the updated metadata, and the request message is used for metadata updating; and the obtaining module is specifically configured to receive a response message, and obtain the code word and the metadata index value from the response message, where the code word is a code word same as one of code words stored by a network side, and the metadata index value corresponding to the updated metadata is a metadata index value generated by the network side and corresponding to the updated metadata.

With reference to any one of the twelfth aspect to the second possible implementation manner of the twelfth aspect, in a third possible implementation manner of the twelfth aspect, the sending module is specifically configured to send a request message, where the request message includes the updated metadata, and the request message is used to request to obtain the code word for broadcasting; and the obtaining module is specifically configured to receive a response message, and obtain the code word and the metadata index value from the response message, where the code word is a code word allocated by a network side to the UE, and the metadata index value corresponding to the updated metadata is a metadata index value generated by the network side and corresponding to the updated metadata.

According to a thirteenth aspect, a data processing apparatus is provided. The apparatus includes: a receiving module, configured to receive updated metadata sent by a user equipment UE. The apparatus also includes a generation module, configured to obtain the metadata transmitted by the receiving module, and generate a metadata index value corresponding to the updated metadata. The apparatus also includes a sending module, configured to obtain the metadata index value transmitted by the generation module, and send the metadata index value to the UE.

With reference to the thirteenth aspect, in a first possible implementation manner of the thirteenth aspect, the generation module is further configured to determine a code word for broadcasting by the UE; and the sending module is specifically configured to send the code word and the metadata index value to the UE.

With reference to the thirteenth aspect or the first possible implementation manner of the thirteenth aspect, in a second possible implementation manner of the thirteenth aspect, the receiving module is specifically configured to receive a request message that is sent by the UE and used for metadata updating, where the request message includes the updated metadata; the generation module is specifically configured to obtain stored code words; and the sending module is specifically configured to send a response message, where the response message includes a code word same as one of the stored code words and the metadata index value corresponding to the updated metadata.

With reference to any one of the thirteenth aspect to the second possible implementation manner of the thirteenth aspect, in a third possible implementation manner of the thirteenth aspect, the receiving module is specifically configured to receive a request message sent by the UE, where the request message includes the updated metadata, and the request message is used to request to obtain the code word for broadcasting; the generation module is specifically configured to allocate the code word to the UE; and the sending module is specifically configured to send a response message, where the response message includes the allocated code word and the metadata index value corresponding to the updated metadata.

According to a fourteenth aspect, a data processing apparatus is provided. The apparatus includes: a sending module, configured to send updated metadata. The apparatus also includes an obtaining module, configured to obtain a code word for broadcasting, where the code word includes a metadata index value corresponding to the updated metadata. The apparatus also includes a broadcasting module, configured to broadcast the obtained code word.

In a first possible implementation manner of the fourteenth aspect, the sending module is specifically configured to send a request message, where the request message includes the updated metadata, and the request message is used for metadata updating; and the obtaining module is specifically configured to receive a response message, and obtain, from the response message, the code word for broadcasting, where the code word is generated by a network side after the network side generates the metadata index value according to the received updated metadata and replaces a metadata index value in a stored code word with the generated metadata index value.

With reference to the fourteenth aspect or the first possible implementation manner of the fourteenth aspect, in a second possible implementation manner of the fourteenth aspect, the sending module is specifically configured to send a request message, where the request message includes the updated metadata, and the request message is used to request to obtain the code word for broadcasting; and the obtaining module is specifically configured for the UE to receive a response message, and obtain, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

According to a fifteenth aspect, a data processing apparatus is provided. The apparatus includes: a receiving module, configured to receive updated metadata sent by a user equipment UE. The apparatus also includes a generation module, configured to generate a metadata index value corresponding to the updated metadata, and generate, by using the metadata index value, a code word for broadcasting by the UE. The apparatus also includes a sending module, configured to send the generated code word.

In a first possible implementation manner of the fifteenth aspect, the receiving module is specifically configured to receive a request message that is sent by the UE and used for metadata updating, where the request message includes the updated metadata; the generation module is specifically configured to obtain a stored code word for broadcasting by the UE, replace a metadata index value in the obtained code word with the metadata index value, and generate the code word for broadcasting by the UE; and the sending module is specifically configured to send a response message, where the response message includes the generated code word.

With reference to the fifteenth aspect or the first possible implementation manner of the fifteenth aspect, in a second possible implementation manner of the fifteenth aspect, the receiving module is specifically configured to receive a request message sent by the UE, where the request message includes the updated metadata, and the request message is used to request to obtain the code word for broadcasting; the generation module is specifically configured to allocate, to the UE, a temporary identity in the code word for broadcasting, and generate, by using the metadata index value and the temporary identity, the code word for broadcasting by the UE; and the sending module is specifically configured to send a response message, where the response message includes the generated code word.

According to a sixteenth aspect, a data processing apparatus is provided. The apparatus includes: a generation module, configured to generate, if metadata needs to be updated, a metadata index value corresponding to the updated metadata. The apparatus also includes a sending module, configured to send the updated metadata and the metadata index value. The apparatus also includes an obtaining module, configured to obtain a code word for broadcasting. The apparatus also includes a broadcasting module, configured to broadcast the obtained code word, where the code word includes the metadata index value.

In a first possible implementation manner of the sixteenth aspect, the sending module is specifically configured to send a request message, where the request message includes the updated metadata and the metadata index value, and the request message is used for metadata updating; and the obtaining module is specifically configured for the UE to receive a response message, and obtain the code word from the received response message, where the code word is generated by a network side by replacing a metadata index value in a stored code word with the metadata index value in the request message.

With reference to the sixteenth aspect or the first possible implementation manner of the sixteenth aspect, in a second possible implementation manner of the sixteenth aspect, the sending module is specifically configured to send a request message, where the request message includes the updated metadata and the metadata index value, and the request message is used to request to obtain the code word for broadcasting; and the obtaining module is specifically configured to receive a response message, and obtain the code word from the received response message, where the code word is generated by a network side by using the metadata index value in the request message and a temporary identity after the network side allocates, to the UE, the temporary identity in the code word for broadcasting.

According to a seventeenth aspect, a data processing apparatus is provided. The apparatus includes: a receiving module, configured to receive updated metadata and a metadata index value corresponding to the updated metadata that are sent by a user equipment UE, where the metadata index value is a metadata index value corresponding to the updated metadata and generated by the UE when the UE needs to update metadata. The apparatus also includes a generation module, configured to generate, by using the received metadata index value, a code word for broadcasting by the UE. The apparatus also includes a sending module, configured to send the generated code word.

In a first possible implementation manner of the seventeenth aspect, the receiving module is specifically configured to receive a request message sent by the UE, where the request message includes the updated metadata and the metadata index value, and the request message is used for metadata updating; the generation module is specifically configured to determine a stored code word of the UE, replace a metadata index value in the stored code word with the received metadata index value, and generate the code word for broadcasting by the UE; and the sending module is specifically configured to send a response message, where the response message includes the generated code word.

With reference to the seventeenth aspect or the first possible implementation manner of the seventeenth aspect, in a second possible implementation manner of the seventeenth aspect, the receiving module is specifically configured to receive a request message sent by the UE, where the request message includes the updated metadata and the metadata index value, and the request message is used to request to obtain the code word for broadcasting; the generation module is specifically configured to allocate, to the UE, a temporary identity in the code word for broadcasting, and generate, by using the metadata index value in the request message and the temporary identity, the code word for broadcasting by the UE; and the sending module is specifically configured to send a response message, where the response message includes the generated code word.

According to an eighteenth aspect, a data processing apparatus is provided. The apparatus includes a sending module, configured to send updated metadata if metadata needs to be updated. The apparatus also includes a generation module, configured to generate a metadata index value corresponding to the updated metadata. The apparatus also includes an obtaining module, configured to obtain a code word for broadcasting. The apparatus also includes a broadcasting module, configured to broadcast the obtained code word and the generated metadata index value.

According to a nineteenth aspect, a data processing apparatus is provided. The apparatus includes: a generation module, configured to generate, if metadata needs to be updated, a metadata index value corresponding to the updated metadata. The apparatus also includes a sending module, configured to send the updated metadata and the metadata index value. The apparatus also includes an obtaining module, configured to obtain a code word for broadcasting. The apparatus also includes a broadcasting module, configured to broadcast the obtained code word and the metadata index value.

In a first possible implementation manner of the nineteenth aspect, the sending module is specifically configured to send a request message, where the request message includes the updated metadata and the metadata index value, and the request message is used for metadata updating; and the obtaining module is specifically configured to receive a response message, and obtain, from the received response message, the code word for broadcasting, where the code word is a code word same as one of code words stored by a network side.

With reference to the nineteenth aspect or the first possible implementation manner of the nineteenth aspect, in a second possible implementation manner of the nineteenth aspect, the sending module is specifically configured to send a request message, where the request message includes the updated metadata and the metadata index value, and the request message is used to request to obtain the code word for broadcasting; and the obtaining module is specifically configured to receive a response message, and obtain, from the received response message, the code word for broadcasting, where the code word is a code word allocated by a network side to the UE.

According to a twentieth aspect, a data processing apparatus is provided. The apparatus includes: a receiving module, configured to receive updated metadata and a metadata index value corresponding to the updated metadata that are sent by a user equipment UE, where the metadata index value is a metadata index value corresponding to the updated metadata and generated by the UE when the UE needs to update metadata. The apparatus includes a determining module, configured to determine a code word for broadcasting by the UE. The apparatus also includes a sending module, configured to send the determined code word.

In a first possible implementation manner of the twentieth aspect, the receiving module is specifically configured to receive a request message sent by the UE, where the request message includes the updated metadata and the metadata index value, and the request message is used for metadata updating; the determining module is specifically configured to obtain stored code words for broadcasting by the UE; and the sending module is specifically configured to send a response message, where the response message includes a code word same as one of the stored code words that are obtained.

With reference to the twentieth aspect or the first possible implementation manner of the twentieth aspect, in a second possible implementation manner of the twentieth aspect, the receiving module is specifically configured to receive a request message sent by the UE, where the request message includes the updated metadata and the metadata index value, and the request message is used to request to obtain the code word for broadcasting; the determining module is specifically configured to allocate the code word to the UE; and the sending module is specifically configured to send a response message, where the response message includes the allocated code word.

According to a twenty-first aspect, a data processing apparatus is provided. The apparatus includes: an obtaining module, configured to monitor and obtain a code word and a metadata index value. The apparatus also includes a determining module, configured to determine, when determining that the obtained code word is a discovered code word, whether the obtained metadata index value is the same as a stored metadata index value. The apparatus also includes a sending module, configured for the UE to send a match report message if the obtained metadata index value is different from the stored metadata index value, where the match report message includes the metadata index value. The apparatus also includes a receiving module, configured to receive a match report response message; where the obtaining module is configured to obtain, from the match report response message, metadata corresponding to the metadata index value.

With reference to the twentieth aspect, in a first possible implementation manner of the twenty-first aspect, the apparatus further includes: a storage module, configured to store the obtained metadata index value.

According to a twenty-second aspect, a data processing apparatus is provided. The apparatus includes: an obtaining module, configured to monitor and obtain a first code word of a proximity service. The apparatus also includes a determining module, configured to determine whether a second code word is stored, where all parts of the second code word except a metadata index value are the same as all parts of the first code word except a metadata index value. The apparatus also includes an execution module, configured to delete, if a determining result is yes, the second code word and a stored service application identity corresponding to the second code word.

According to a twenty-third aspect, a data processing device is provided. The device includes: an interface, configured to send updated metadata. The device also includes a memory, configured to store program code. The device also includes and a signal processor, configured to obtain, according to the program code stored in the memory, a metadata index value corresponding to the updated metadata transmitted by the interface. The interface is further configured to broadcast the metadata index value obtained and transmitted by the signal processor.

In a first possible implementation manner of the twenty-third aspect, the signal processor is further configured to obtain a code word for broadcasting; and the interface is specifically configured to broadcast the code word and the metadata index value that are obtained.

With reference to the twenty-third aspect or the first possible implementation manner of the twenty-third aspect, in a second possible implementation manner of the twenty-third aspect, the interface is specifically configured to send a request message, where the request message includes the updated metadata, and the request message is used for metadata updating; and the signal processor is specifically configured to receive a response message, and obtain the code word and the metadata index value from the response message, where the code word is a code word same as one of code words stored by a network side, and the metadata index value corresponding to the updated metadata is a metadata index value generated by the network side and corresponding to the updated metadata.

With reference to the twenty-third aspect to the second possible implementation manner of the twenty-third aspect, in a third possible implementation manner of the twenty-third aspect, the interface is specifically configured to send a request message, where the request message includes the updated metadata, and the request message is used to request to obtain the code word for broadcasting; and the signal processor is specifically configured to receive a response message, and obtain the code word and the metadata index value from the response message, where the code word is a code word allocated by a network side to the UE, and the metadata index value corresponding to the updated metadata is a metadata index value generated by the network side and corresponding to the updated metadata.

According to a twenty-fourth aspect, a data processing device is provided. The device includes an interface, configured to receive updated metadata sent by a user equipment UE. The device also includes a memory, configured to store program code. The device also includes a signal processor, configured to obtain, according to the program code stored in the memory, the metadata transmitted by the interface, and generate a metadata index value corresponding to the updated metadata. The interface is further configured to obtain the metadata index value transmitted by the signal processor, and send the metadata index value to the UE.

In a first possible implementation manner of the twenty-fourth aspect, the signal processor is further configured to determine a code word for broadcasting by the UE; and the interface is specifically configured to send the code word and the metadata index value to the UE.

With reference to the twenty-fourth aspect or the first possible implementation manner of the twenty-fourth aspect, in a second possible implementation manner of the twenty-fourth aspect, the interface is specifically configured to receive a request message that is sent by the UE and used for metadata updating, where the request message includes the updated metadata; the signal processor is specifically configured to obtain stored code words; and the interface is specifically configured to send a response message, where the response message includes a code word same as one of the stored code words and the metadata index value corresponding to the updated metadata.

With reference to the twenty-fourth aspect to the second possible implementation manner of the twenty-fourth aspect, in a third possible implementation manner of the twenty-fourth aspect, the interface is specifically configured to receive a request message sent by the UE, where the request message includes the updated metadata, and the request message is used to request to obtain the code word for broadcasting; the signal processor is specifically configured to allocate the code word to the UE; and the interface is specifically configured to send a response message, where the response message includes the allocated code word and the metadata index value corresponding to the updated metadata.

According to a twenty-fifth aspect, a data processing device is provided. The device includes an interface, configured to send updated metadata. The device also includes a memory, configured to store a program instruction. The device also includes a signal processor, configured to obtain, according to the program instruction stored in the memory, a code word for broadcasting, where the code word includes a metadata index value corresponding to the updated metadata. The interface is further configured to broadcast the obtained code word.

In a first possible implementation manner of the twenty-fifth aspect, the interface is specifically configured to send a request message, where the request message includes the updated metadata, and the request message is used for metadata updating; and the signal processor is specifically configured to receive a response message, and obtain, from the response message, the code word for broadcasting, where the code word is generated by a network side after the network side generates the metadata index value according to the received updated metadata and replaces a metadata index value in a stored code word with the generated metadata index value.

With reference to the twenty-fifth aspect or the first possible implementation manner of the twenty-fifth aspect, in a second possible implementation manner of the twenty-fifth aspect, the interface is specifically configured to send a request message, where the request message includes the updated metadata, and the request message is used to request to obtain the code word for broadcasting; and the signal processor is specifically configured for the UE to receive a response message, and obtain, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

According to a twenty-sixth aspect, a data processing device is provided. The device includes an interface, configured to receive updated metadata sent by a user equipment UE. The device also includes a memory, configured to store a program instruction. The device also includes a signal processor, configured to generate, according to the program instruction stored in the memory, a metadata index value corresponding to the updated metadata, and generate, by using the metadata index value, a code word for broadcasting by the UE. The interface is further configured to send the generated code word.

In a first possible implementation manner of the twenty-sixth aspect, the interface is specifically configured to receive a request message that is sent by the UE and used for metadata updating, where the request message includes the updated metadata; the signal processor is specifically configured to obtain a stored code word for broadcasting by the UE, replace a metadata index value in the obtained code word with the metadata index value, and generate the code word for broadcasting by the UE; and the interface is specifically configured to send a response message, where the response message includes the generated code word.

With reference to the twenty-sixth aspect or the first possible implementation manner of the twenty-sixth aspect, in a second possible implementation manner of the twenty-sixth aspect, the interface is specifically configured to receive a request message sent by the UE, where the request message includes the updated metadata, and the request message is used to request to obtain the code word for broadcasting; the signal processor is specifically configured to allocate, to the UE, a temporary identity in the code word for broadcasting, and generate, by using the metadata index value and the temporary identity, the code word for broadcasting by the UE; and the interface is specifically configured to send a response message, where the response message includes the generated code word.

According to a twenty-seventh aspect, a data processing device is provided. The device includes a memory, configured to store program code. The device also includes a signal processor, configured to generate, according to the program code stored in the memory, if metadata needs to be updated, a metadata index value corresponding to the updated metadata. The device also includes an interface, configured to send the updated metadata and the metadata index value. The signal processor is further configured to obtain a code word for broadcasting. The interface is further configured to broadcast the obtained code word, where the code word includes the metadata index value.

In a first possible implementation manner of the twenty-seventh aspect, the interface is specifically configured to send a request message, where the request message includes the updated metadata and the metadata index value, and the request message is used for metadata updating; and the signal processor is specifically configured for the UE to receive a response message, and obtain the code word from the received response message, where the code word is generated by a network side by replacing a metadata index value in a stored code word with the metadata index value in the request message.

With reference to the twenty-seventh aspect or the first possible implementation manner of the twenty-seventh aspect, in a second possible implementation manner of the twenty-seventh aspect, the interface is specifically configured to send a request message, where the request message includes the updated metadata and the metadata index value, and the request message is used to request to obtain the code word for broadcasting; and the signal processor is specifically configured to receive a response message, and obtain the code word from the received response message, where the code word is generated by a network side by using the metadata index value in the request message and a temporary identity after the network side allocates, to the UE, the temporary identity in the code word for broadcasting.

According to a twenty-eighth aspect, a data processing device is provided. The device includes: an interface, configured to receive updated metadata and a metadata index value corresponding to the updated metadata that are sent by a user equipment UE, where the metadata index value is a metadata index value corresponding to the updated metadata and generated by the UE when the UE needs to update metadata. The device also includes a memory, configured to store program code. The device also includes a signal processor, configured to generate, according to the program code stored in the memory and by using the received metadata index value, a code word for broadcasting by the UE; where the interface is further configured to send the generated code word.

In a first possible implementation manner of the twenty-eighth aspect, the interface is specifically configured to receive a request message sent by the UE, where the request message includes the updated metadata and the metadata index value, and the request message is used for metadata updating; the signal processor is specifically configured to determine a stored code word of the UE, replace a metadata index value in the stored code word with the received metadata index value, and generate the code word for broadcasting by the UE; and the interface is specifically configured to send a response message, where the response message includes the generated code word.

With reference to the twenty-eighth aspect or the first possible implementation manner of the twenty-eighth aspect, in a second possible implementation manner of the twenty-eighth aspect, the interface is specifically configured to receive a request message sent by the UE, where the request message includes the updated metadata and the metadata index value, and the request message is used to request to obtain the code word for broadcasting; the signal processor is specifically configured to allocate, to the UE, a temporary identity in the code word for broadcasting, and generate, by using the metadata index value in the request message and the temporary identity, the code word for broadcasting by the UE; and the interface is specifically configured to send a response message, where the response message includes the generated code word.

According to a twenty-ninth aspect, a data processing device is provided. The device includes an interface, configured to send updated metadata if metadata needs to be updated. The device also includes a memory, configured to store program code. The device also includes a signal processor, configured to generate, according to the program code stored in the memory, a metadata index value corresponding to the updated metadata, and configured to obtain a code word for broadcasting. The interface is further configured to broadcast the obtained code word and the generated metadata index value.

According to a thirtieth aspect, a data processing device is provided. The device includes: a memory, configured to store program code; a signal processor, configured to generate, according to the program code stored in the memory, if metadata needs to be updated, a metadata index value corresponding to the updated metadata. The device also includes an interface, configured to send the updated metadata and the metadata index value. The signal processor is further configured to obtain a code word for broadcasting. The interface is further configured to broadcast the obtained code word and the metadata index value.

In a first possible implementation manner of the thirtieth aspect, the interface is specifically configured to send a request message, where the request message includes the updated metadata and the metadata index value, and the request message is used for metadata updating; and the signal processor is specifically configured to receive a response message, and obtain, from the received response message, the code word for broadcasting, where the code word is a code word same as one of code words stored by a network side.

With reference to the thirtieth aspect or the first possible implementation manner of the thirtieth aspect, in a second possible implementation manner of the thirtieth aspect, the interface is specifically configured to send a request message, where the request message includes the updated metadata and the metadata index value, and the request message is used to request to obtain the code word for broadcasting; and the signal processor is specifically configured to receive a response message, and obtain, from the received response message, the code word for broadcasting, where the code word is a code word allocated by a network side to the UE.

According to a thirty-first aspect, a data processing device is provided. The device includes: an interface, configured to receive updated metadata and a metadata index value corresponding to the updated metadata that are sent by a user equipment UE, where the metadata index value is a metadata index value corresponding to the updated metadata and generated by the UE when the UE needs to update metadata. The device also includes a memory, configured to store program code. The device also includes a signal processor, configured to determine, according to the program code stored in the memory, a code word for broadcasting by the UE. The interface is further configured to send the determined code word.

In a first possible implementation manner of the thirty-first aspect, the interface is specifically configured to receive a request message sent by the UE, where the request message includes the updated metadata and the metadata index value, and the request message is used for metadata updating; the signal processor is specifically configured to obtain stored code words for broadcasting by the UE; and the interface is specifically configured to send a response message, where the response message includes a code word same as one of the stored code words that are obtained.

With reference to the thirty-first aspect or the first possible implementation manner of the thirty-first aspect, in a second possible implementation manner of the thirty-first aspect, the interface is specifically configured to receive a request message sent by the UE, where the request message includes the updated metadata and the metadata index value, and the request message is used to request to obtain the code word for broadcasting; the signal processor is specifically configured to allocate the code word to the UE; and the interface is specifically configured to send a response message, where the response message includes the allocated code word.

According to a thirty-second aspect, a data processing device is provided. The device includes: a memory, configured to store program code; a signal processor, configured to monitor and obtain a code word and a metadata index value according to the program code stored in the memory, and when determining that the obtained code word is a discovered code word, determine whether the obtained metadata index value is the same as a stored metadata index value. The device also includes an interface, configured for the UE to send a match report message if the obtained metadata index value is different from the stored metadata index value, where the match report message includes the metadata index value; and receive a match report response message; where the signal processor is further configured to obtain, from the match report response message, metadata corresponding to the metadata index value.

In a first possible implementation manner of the thirty-second aspect, the memory is further configured to store the obtained metadata index value.

According to a thirty-third aspect, a data processing device is provided. The device includes: a memory, configured to store program code. The device also includes a signal processor, configured to obtain the program code stored in the memory, and monitor and obtain a first code word of a proximity service according to the program code; and configured to determine whether a second code word is stored, where all parts of the second code word except a metadata index value are the same as all parts of the first code word except a metadata index value; and if a determining result is yes, delete the second code word and a stored service application identity corresponding to the second code word.

According to a thirty-fourth aspect, a data processing method is provided. The method includes: monitoring and obtaining, by a user equipment UE, a first code word of a proximity service. The method also includes obtaining, by the UE, a ProSe application ID corresponding to the first code word. The method also includes determining, by the UE, whether a mapping relationship between the ProSe application ID and a third code word is stored, and if a determining result is yes, deleting the mapping relationship between the ProSe application ID and the third code word. The method also includes storing a mapping relationship between the obtained first code word and the ProSe application ID. The third code word is the first code word or a second code word. The second code word is a code word in which all parts except a metadata index value metadata index are the same as all parts of the obtained first code word except a metadata index value.

According to a thirty-fifth aspect, a data processing method is provided. The method includes: monitoring and obtaining, by a user equipment UE, a code word. The method also includes, when determining that the obtained code word is a discovered code word, determining, by the UE, whether an obtained metadata index value is the same as a stored metadata index value. The method also includes, if the obtained metadata index value is different from the stored metadata index value, sending, by the UE, a match report message, where the match report message includes the obtained code word. The method also includes receiving, by the UE, a match report response message. The method also includes obtaining, by the UE, from the match report response message, a ProSe application ID corresponding to the code word and metadata corresponding to the ProSe application ID, or obtaining a ProSe application ID corresponding to the code word and metadata corresponding to the metadata index value, of a proximity service application.

With reference to the thirty-fifth aspect, in a first possible implementation manner of the thirty-fifth aspect, the determining, by the UE, that the obtained code word is a discovered code word, includes: determining, by the UE, whether a mapping relationship between the obtained code word and the proximity service application identity ProSe application ID is stored, and if a determining result is yes, determining, by the UE, that the obtained code word is the discovered code word.

According to a thirty-sixth aspect, a data processing apparatus is provided. The apparatus includes: a monitoring module, configured to monitor and obtain a first code word of a proximity service. The apparatus also includes an obtaining module, configured to obtain a ProSe application ID corresponding to the first code word. The apparatus also includes a determining module, configured to determine whether a mapping relationship between the ProSe application ID and a third code word is stored. The apparatus also includes an execution module, configured to: if a determining result is yes, delete the mapping relationship between the ProSe application ID and the third code word, and store a mapping relationship between the obtained first code word and the ProSe application ID; where the third code word is the first code word or a second code word, where the second code word is a code word in which all parts except a metadata index value metadata index are the same as all parts of the obtained first code word except a metadata index value.

According to a thirty-seventh aspect, a data processing apparatus is provided. The apparatus includes: an obtaining module, configured to monitor and obtain a code word. The apparatus also includes a determining module, configured to determine, when determining that the obtained code word is a discovered code word, whether an obtained metadata index value is the same as a stored metadata index value. The apparatus also includes a sending module, configured for the UE to send a match report message if the obtained metadata index value is different from the stored metadata index value, where the match report message includes the obtained code word. The apparatus also includes a receiving module, configured to receive a match report response message. The obtaining module is configured to obtain, from the match report response message, a ProSe application ID corresponding to the code word and metadata corresponding to the ProSe application ID, or obtain a ProSe application ID corresponding to the code word and metadata corresponding to the metadata index value, of a proximity service application.

With reference to the thirty-seventh aspect, in a first possible implementation manner of the thirtieth aspect, the determining module is specifically configured to determine whether a mapping relationship between the obtained code word and the proximity service application identity ProSe application ID is stored, and if a determining result is yes, determine that the obtained code word is the discovered code word.

According to a thirty-eighth aspect, a data processing device is provided. The device includes: a signal processor, configured to monitor and obtain a first code word of a proximity service by using an interface, obtain a ProSe application ID corresponding to the first code word, determine whether a mapping relationship between the ProSe application ID and a third code word is stored, and if a determining result is yes, delete the mapping relationship between the ProSe application ID and the third code word.

The device also includes a memory, configured to store a mapping relationship between the obtained first code word and the ProSe application ID. The third code word is the first code word or a second code word. The second code word is a code word in which all parts except a metadata index value metadata index are the same as all parts of the obtained first code word except a metadata index value.

According to a thirty-ninth aspect, a data processing device is provided. The device includes: a signal processor, configured to monitor and obtain a code word, and when determining that the obtained code word is a discovered code word, determine whether an obtained metadata index value is the same as a stored metadata index value, and if the obtained metadata index value is different from the stored metadata index value, send a match report message by using an interface, where the match report message includes the obtained code word. The device also includes the interface, configured to receive a match report response message. The signal processor is configured to obtain, from the match report response message, a ProSe application ID corresponding to the code word and metadata corresponding to the ProSe application ID, or obtain a ProSe application ID corresponding to the code word and metadata corresponding to the metadata index value, of a proximity service application. The device also includes a memory, configured to store the code word, the ProSe application ID, and the metadata.

With reference to the thirty-ninth aspect, in a first possible implementation manner of the thirty-ninth aspect, the signal processor is specifically configured to determine whether a mapping relationship between the obtained code word and the proximity service application identity ProSe application ID is stored in the memory, and if a determining result is yes, determine, by the UE, that the obtained code word is the discovered code word.

According to the foregoing technical solutions, when metadata is updated, a metadata index value corresponding to the metadata is determined, and further, a UE broadcasts the metadata index value. The technical solutions are used to solve a problem that when service data is updated, a monitoring UE cannot accurately and effectively obtain updated service data provided by an announcing UE.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
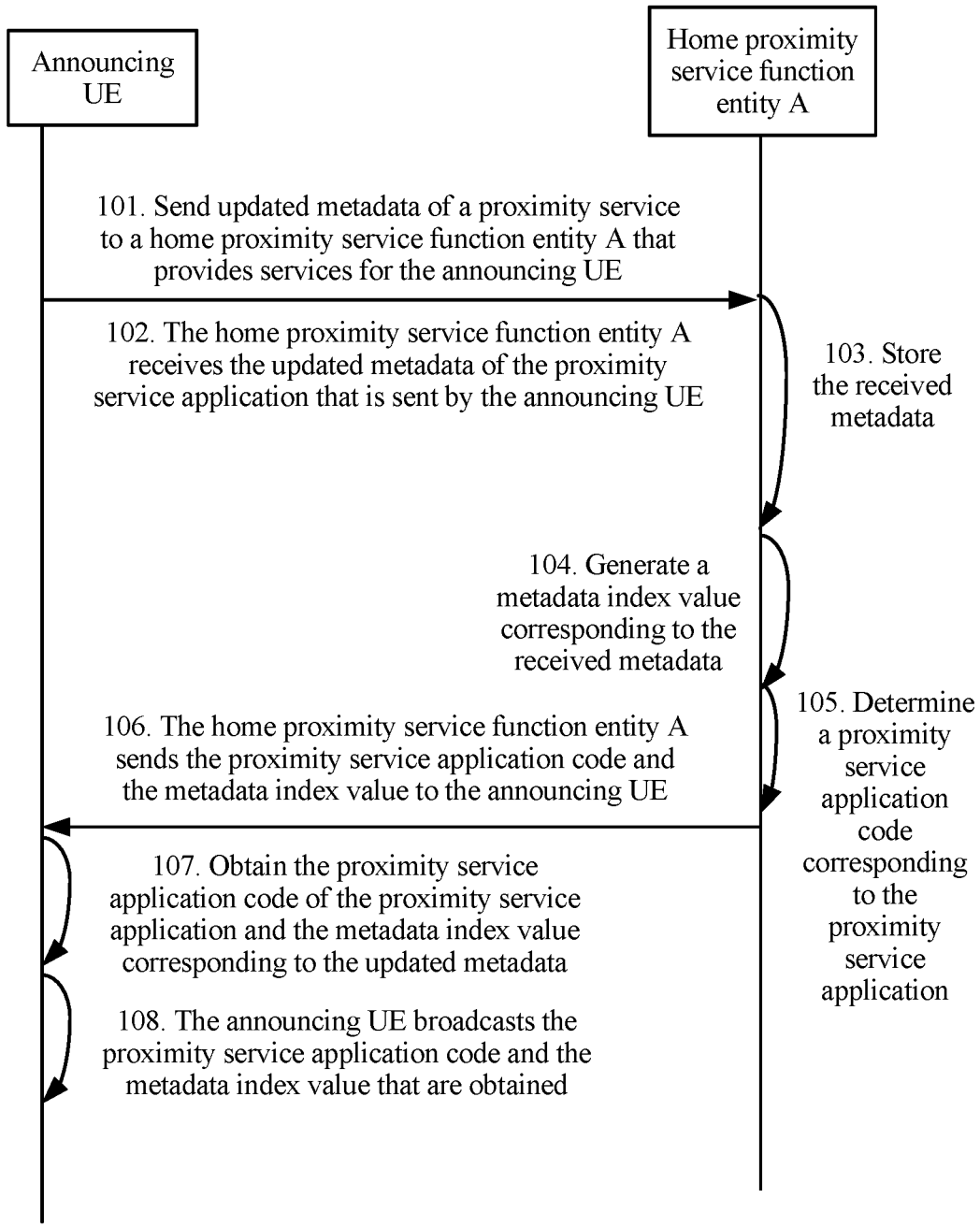
FIG. 1 is a flowchart of a data processing method according to Embodiment 1 of the present disclosure.

In normal cases, for continuously updated service data, after a monitoring UE obtains, according to a detected ProSe application code broadcast by an announcing UE, service data provided by the announcing UE, the monitoring UE cannot learn the updated service data provided by the announcing UE. In view of this problem, in a technical solution provided by the present disclosure, for updated metadata, a corresponding metadata index value is allocated, and the metadata index value is introduced to resolve the problem that when the service data is updated, the monitoring UE cannot accurately and effectively obtain the updated service data provided by the announcing UE.

Main implementation principles and specific implementation manners of the technical solutions of the embodiments of the present disclosure, and corresponding advantageous effects that can be achieved thereby are hereinafter described in detail with reference to the accompanying drawings.

For ease of description, in the technical solution provided by the embodiments of the present disclosure, details are described by using application data processing in a proximity service as an example. A proximity service data processing system includes terminal-side devices and network-side devices. The terminal-side devices include at least one announcing UE and at least one monitoring UE. The network-side devices include a home proximity service function (home ProSe function) entity that provides services for the announcing UE and a home ProSe function that provides services for the monitoring UE. The home ProSe function that provides services for the announcing UE can communicate with the home ProSe function that provides services for the monitoring UE. The home ProSe function provided in the embodiments of the present disclosure is a network entity that provides a corresponding service function for the proximity service, so that in the proximity service, two UEs that are close to each other can perform mutual discovery only by using the home ProSe function and communicate with each other, without using a network, that is, without using entities such as a base station and a gateway.

The home ProSe function that provides services for the announcing UE and the home ProSe function that provides services for the monitoring UE may be two independent network-side devices, or may be two functional modules integrated in a network-side device. For ease of description, in the technical solution provided by each embodiment of the present disclosure, the home ProSe function that provides services for the announcing UE and the home ProSe function that provides services for the monitoring UE are described in detail as two independent network-side devices, and are respectively marked as a home ProSe function A and a home ProSe function B. Communication can be performed between the home ProSe function A and the home ProSe function B.

In the proximity service, the announcing UE needs to broadcast a code word, and the code word is specifically a ProSe application code. Metadata provided in each embodiment of the present disclosure refers to information provided by a service application on a UE, for example, other information such as phones and addresses. A proximity service application provided in each embodiment of the present disclosure refers to a specific service or application using a proximity service function on a terminal. The ProSe application code and metadata in each embodiment of the present disclosure are a ProSe application code and metadata corresponding to a certain specified service application on a terminal.

Embodiment 1

Embodiment 1 of the present disclosure provides a data processing method. As shown in FIG. 1, a specific processing procedure of the method includes the following steps.

Step 101: When an announcing UE needs to update metadata of a proximity service application, the announcing UE sends updated metadata of the proximity service to a home ProSe function A that provides services for the announcing UE.

In an implementation manner, the announcing UE may send a first request message, where the first request message includes the updated metadata, that is, the first request message is used for metadata updating.

In an implementation manner, the announcing UE may send a second request message, where the second request message includes the updated metadata, and the second request is used to obtain a code word for broadcasting.

The first request message and the second request message may be implemented by using a same message, or may be implemented by using different messages.

In specific implementation, in a proximity service, the first request message and the second request message may be implemented by using a discovery request.

If the first request message is implemented by using the discovery request, that is, the discovery request is used for metadata updating, a command command field in the discovery request may be set to metadata_update or null, for indicating that the first request message is used for metadata updating.

If the second request message is implemented by using the discovery request, that is, the discovery request is used to request a code word for broadcasting (for example, a ProSe application code), the command command field in the discovery request may be set to announce, for indicating that the second request message is used to request to obtain a code word for broadcasting (for example, a ProSe application code).

The discovery request may further include a proximity service application identity (ProSe application ID), an identity of the announcing UE, a service application identity triggering the proximity service application, and the like. In the technical solution provided by Embodiment 1 of the present disclosure, the code word for broadcasting may be a ProSe application code in the proximity service.

Step 102: The home ProSe function A receives the updated metadata of the proximity service application that is sent by the announcing UE.

The home ProSe function A may receive the first request message, and obtain the updated metadata from the received first request message.

The home ProSe function A may receive the second request message, and obtain the updated metadata from the received second request message.

For the first request message and the second request message, reference may be made to detailed descriptions in the foregoing step 101, and details are not further described in this step.

Specifically, the home ProSe function A receives the discovery request sent by the announcing UE.

Step 103: The home ProSe function A stores the received metadata.

Step 104: The home ProSe function A generates a metadata index value corresponding to the received metadata.

The home ProSe function A generates, according to the following procedure, the metadata index corresponding to the received metadata:

Step 1 : The home ProSe function A determines whether a metadata index is stored. If a determining result is yes, performs step 2, or if a determining result is no, performs step 3.

Step 2: Update the existing metadata index, for example, add a specified numeric value, and generate the metadata index corresponding to the received metadata.

1 may be added to the specified numeric value in sequence, or the specified numeric value may be another numeric value such as 2 or 3, or may be a randomly generated numeric value or a set numeric value.

Step 3: If a determining result is no, the home ProSe function A generates the metadata index.

Step 105: The home ProSe function A determines a ProSe application code corresponding to the proximity service application.

In an implementation manner, the first request message is used for metadata updating. Indication information for metadata updating may be included in the first request message to indicate that the first request message is used for metadata updating. The home ProSe function A obtains a ProSe application code stored in the UE context and corresponding to the proximity service application, and allocates, to the UE, a ProSe application code same as the obtained stored ProSe application code corresponding to the proximity service application.

In this manner, the home ProSe function A receives the discovery request, and determines, according to a command field value in the discovery request, that the request message is used for metadata updating. That is, if the command field value is metadata-update or the command field is set to null, it represents an indication for metadata updating, and is used to indicate that the first request message is used for metadata updating. The home ProSe function A obtains the stored ProSe application code corresponding to the proximity service application, and allocates, to the UE, the ProSe application code same as the stored ProSe application code corresponding to the proximity service application.

In an implementation manner, the second request message sent by the announcing UE is received, where the second request message is used to request to obtain a code word for broadcasting (for example, the ProSe application code provided by Embodiment 1 of the present disclosure). The home ProSe function A allocates a corresponding ProSe application code to the service application according to the second request message.

If the second request message is implemented by using the discovery request, in this manner, the home ProSe function A determines that the received discovery request is used to request to obtain a ProSe application code for broadcasting, and the home ProSe function A allocates a new ProSe application code to the proximity service application.

Specifically, it may be determined, according to the command field value in the discovery request, that the request message is used to obtain a ProSe application code for broadcasting. That is, if the command field value is announce, which indicates that the second request message is used to obtain a ProSe application code for broadcasting, the home ProSe function A generates a new ProSe application code for the proximity service application.

Step 106: The home ProSe function A sends the ProSe application code and the metadata index to the announcing UE.

In an implementation manner, the home ProSe function A sends a first response message, where the first response message includes the ProSe application code of the proximity service application and the metadata index corresponding to the updated metadata.

In an implementation manner, the home ProSe function A sends a second response message, where the second response message includes the ProSe application code of the proximity service application and the metadata index corresponding to the updated metadata.

The first response message and the second response message may be implemented by using a same message, or may be implemented by using different messages. The first response message corresponds to the foregoing first request message, and the second response message corresponds to the foregoing second request message.

In the technical solution provided by Embodiment 1 of the present disclosure, the first response message or the second response message may be implemented by using a discovery response. In specific implementation, the home ProSe function A sends a discovery response message, where the discovery response includes the ProSe application code of the proximity service application, the metadata index corresponding to the updated metadata, and a validity timer corresponding to the ProSe application code.

Step 107: The announcing UE obtains the ProSe application code of the proximity service application and the metadata index corresponding to the updated metadata.

In an implementation manner, the announcing UE receives the first response message, and obtains, from the first response message, the ProSe application code of the proximity service application and the metadata index corresponding to the updated metadata.

In this manner, the ProSe application code of the proximity service application is the ProSe application code allocated by the home ProSe function A to the announcing UE and same as the stored ProSe application code.

In an implementation manner, the announcing UE receives the second response message, and obtains the ProSe application code of the proximity service application from the received second response message, where the ProSe application code is allocated by the home ProSe function A to the proximity service application of the announcing UE.

Step 108: The announcing UE broadcasts the ProSe application code and the metadata index that are obtained.

Specifically, a message broadcast by the announcing UE includes the ProSe application code and the metadata index that are obtained.

Correspondingly, Embodiment 1 of the present disclosure provides a data processing method, where the data processing method may be applied to service application data processing, for example, the service application data processing in the proximity service mentioned above, and a code word mentioned in the data processing method may be a common code word corresponding to a service application or may be a ProSe application code corresponding to a proximity service application. A specific processing procedure of the data processing method includes the following steps.

Step 1: A UE sends updated metadata.

When the UE needs to update metadata of a service application, the UE sends updated metadata.

Step 2: Obtain a metadata index value corresponding to the updated metadata.

Step 3: The UE broadcasts the obtained metadata index value.

Before the UE broadcasts the obtained metadata index value in step 3, the method further includes: obtaining a code word for broadcasting.

That the UE broadcasts the obtained metadata index value includes: the UE broadcasts the code word and the metadata index value that are obtained.

The UE may send the updated metadata in the following two manners:

One manner is: the UE sends a request message, where the request message includes the updated metadata, and the request message is used for metadata updating.

Another manner is: the UE sends a request message, where the request message includes the updated metadata, and the request message is used to request to obtain the code word for broadcasting.

In the foregoing two manners, the UE may send the request message used for metadata updating and the request message used to request to obtain the code word for broadcasting, where the messages may be implemented by using a same message, for example, the foregoing discovery request, or may be implemented by using two mutually independent messages. This is not limited in the technical solution provided by Embodiment 1 of the present disclosure.

Correspondingly, the obtaining a code word and a metadata index value corresponding to the updated metadata may include the following two implementation manners.

One manner is: the UE receives a response message, and obtains the code word and the metadata index value from the response message, where the code word is a code word same as one of code words stored by a network side, and the metadata index value corresponding to the updated metadata is a metadata index value generated by the network side and corresponding to the updated metadata.

One manner is: the UE receives a response message, and obtains the code word and the metadata index value from the response message, where the code word is a code word allocated by a network side to the UE, and the metadata index value corresponding to the updated metadata is a metadata index value generated by the network side and corresponding to the updated metadata.

In the foregoing two manners, the UE receives the response message and obtains the code word and/or the metadata index value from the response message, where the response message may be implemented by using independent response messages or may be implemented by using a same response message, for example, the foregoing discovery response, and may obtain the code word and the metadata index value from the discovery response.

Figure 2A:
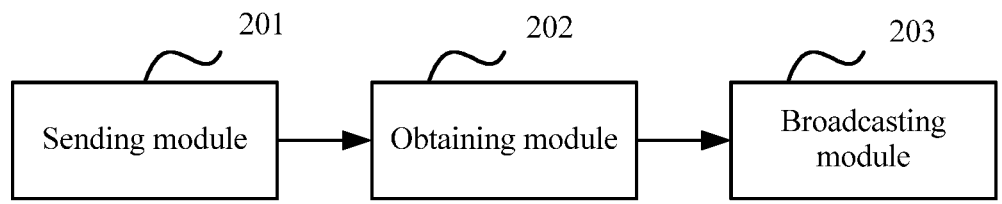
FIG. 2a is a schematic structural diagram of a data processing apparatus according to an embodiment of the present disclosure.

Correspondingly, Embodiment 1 of the present disclosure provides a data processing apparatus, as shown in FIG. 2a, including: a sending module 201, configured to send updated metadata; an obtaining module 202, configured to obtain a metadata index value corresponding to the updated metadata transmitted by the sending module 201; and a broadcasting module 203, configured to broadcast the metadata index value obtained and transmitted by the obtaining module 202.

Optionally, the obtaining module 202 is further configured to obtain a code word for broadcasting; and the broadcasting module 203 is specifically configured to broadcast the code word and the metadata index value that are obtained.

Specifically, the sending module 201 is specifically configured to send a request message, where the request message includes the updated metadata, and the request message is used for metadata updating; and the obtaining module 202 is specifically configured to receive a response message, and obtain the code word and the metadata index value from the response message, where the code word is a code word same as one of code words stored by a network side, and the metadata index value corresponding to the updated metadata is a metadata index value generated by the network side and corresponding to the updated metadata.

Specifically, the sending module 201 is specifically configured to send a request message, where the request message includes the updated metadata, and the request message is used to request to obtain the code word for broadcasting; and specifically, the obtaining module 202 is specifically configured to receive a response message, and obtain the code word and the metadata index value from the response message, where the code word is a code word allocated by a network side to the UE, and the metadata index value corresponding to the updated metadata is a metadata index value generated by the network side and corresponding to the updated metadata.

Figure 2B:
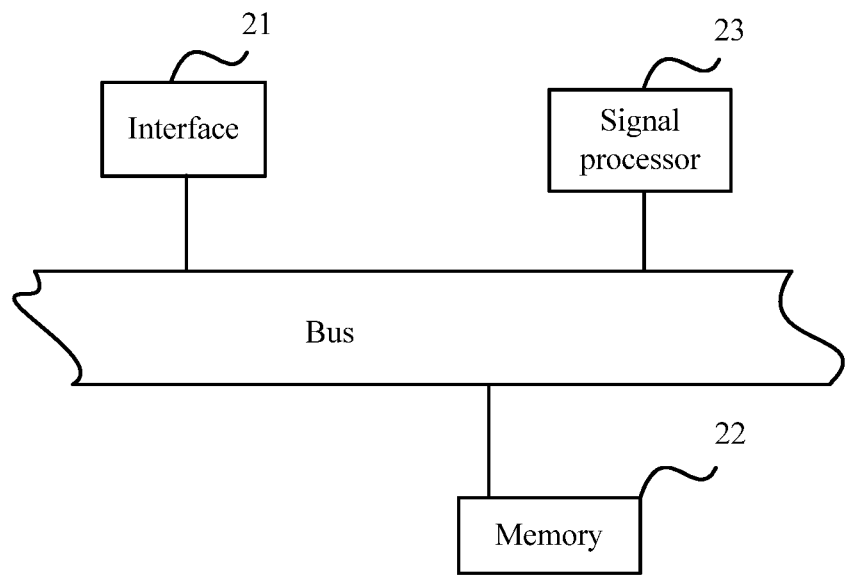
FIG. 2b is a schematic structural diagram of a data processing device according to an embodiment of the present disclosure.

Correspondingly, Embodiment 1 of the present disclosure provides a data processing device, as shown in FIG. 2b, including an interface 21, a memory 22, and a signal processor 23.

The interface 21 is configured to send updated metadata.

The interface may be one or more of the following: a network interface controller (NIC) providing a wired interface, for example, an Ethernet NIC, where the Ethernet NIC may provide a copper wire interface and/or a fiber interface; or a NIC providing a wireless interface, for example, a wireless local area network (WLAN) NIC.

The memory 22 is configured to store program code.

The memory may be a volatile memory, for example, a random access memory (RAM); or a non-volatile memory, for example, a flash memory, a hard disk drive (HDD), or a solid-state drive (SSD); or a combination of the foregoing types of memories.

The signal processor 23 is configured to obtain, according to the program code stored in the memory 22, a metadata index value corresponding to the updated metadata transmitted by the interface 21.

The signal processor 23 may be a central processing unit (CPU), or a combination of a CPU and a hardware chip. The signal processor may also be a network processor (NP), or a combination of a CPU and an NP, or a combination of an NP and a hardware chip.

The hardware chip may be one or a combination of the following: an application-specific integrated circuit (ASIC), a field-programmable gate array (FPGA), and a complex programmable logic device (CPLD).

The interface 21 is further configured to broadcast the metadata index value obtained and transmitted by the signal processor.

Optionally, the signal processor 23 is further configured to obtain a code word for broadcasting; and specifically, the interface 21 is specifically configured to broadcast the code word and the metadata index value that are obtained.

Specifically, the interface 21 is specifically configured to send a request message, where the request message includes the updated metadata, and the request message is used for metadata updating; and specifically, the signal processor 23 is specifically configured to receive a response message, and obtain the code word and the metadata index value from the response message, where the code word is a code word same as one of code words stored by a network side, and the metadata index value corresponding to the updated metadata is a metadata index value generated by the network side and corresponding to the updated metadata.

Specifically, the interface 21 is specifically configured to send a request message, where the request message includes the updated metadata, and the request message is used to request to obtain the code word for broadcasting; and specifically, the signal processor 23 is specifically configured to receive a response message, and obtain the code word and the metadata index value from the response message, where the code word is a code word allocated by a network side to the UE, and the metadata index value corresponding to the updated metadata is a metadata index value generated by the network side and corresponding to the updated metadata.

Correspondingly, Embodiment 1 of the present disclosure provides a data processing method. A specific processing procedure of the method includes the following steps.

Step 1: Receive updated metadata sent by a UE.

Step 2: Generate a metadata index value corresponding to the updated metadata.

Step 3: Send the metadata index value to the UE.

Optionally, before the sending the metadata index value to the UE in the foregoing step 3, the method further includes: determining a code word for broadcasting by the UE; and the sending the metadata index value to the UE includes: sending the code word and the metadata index value to the UE.

A manner of receiving the updated metadata sent by the UE may be: receiving a request message that is sent by the UE and used for metadata updating, where the request message includes the updated metadata; the determining a code word for broadcasting by the UE includes: obtaining stored code words; and the sending the code word and the metadata index value to the UE includes: sending a response message, where the response message includes a code word same as one of the stored code words and the metadata index value corresponding to the updated metadata.

A manner of receiving the updated metadata sent by the UE may be: receiving a request message sent by the UE, where the request message includes the updated metadata, and the request message is used to request to obtain the code word for broadcasting; the determining a code word for broadcasting by the UE includes: allocating the code word to the UE; and the sending the code word and the metadata index value to the UE includes: sending a response message, where the response message includes the allocated code word and the metadata index value corresponding to the updated metadata.

Figure 3A:
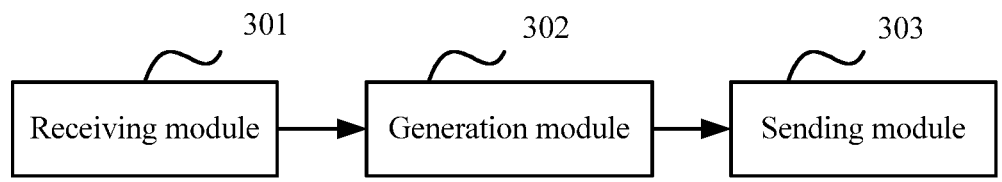
FIG. 3a is a schematic structural diagram of a data processing apparatus according to an embodiment of the present disclosure.

Correspondingly, Embodiment 1 of the present disclosure provides a data processing apparatus, as shown in FIG. 3a, including: a receiving module 301, configured to receive updated metadata sent by a user equipment UE; a generation module 302, configured to obtain the metadata transmitted by the receiving module, and generate a metadata index value corresponding to the updated metadata; and a sending module 303, configured to obtain the metadata index value transmitted by the generation module, and send the metadata index value to the UE.

Optionally, the generation module 302 is further configured to determine a code word for broadcasting by the UE; and specifically, the sending module 303 is specifically configured to send the code word and the metadata index value to the UE.

Specifically, the receiving module 301 is specifically configured to receive a request message that is sent by the UE and used for metadata updating, where the request message includes the updated metadata; specifically, the generation module 302 is specifically configured to obtain stored code words; and specifically, the sending module 303 is specifically configured to send a response message, where the response message includes a code word same as one of the stored code words and the metadata index value corresponding to the updated metadata.

Specifically, the receiving module 301 is specifically configured to receive a request message sent by the UE, where the request message includes the updated metadata, and the request message is used to request to obtain the code word for broadcasting; specifically, the generation module 302 is specifically configured to allocate the code word to the UE; and specifically, the sending module 303 is specifically configured to send a response message, where the response message includes the allocated code word and the metadata index value corresponding to the updated metadata.

Correspondingly, Embodiment 1 of the present disclosure provides a data processing device, and a schematic structural diagram of the data processing device is the same as that shown in FIG. 2b. The data processing device includes an interface, a memory, and a signal processor.

The interface is configured to receive updated metadata sent by a user equipment UE.

The interface may be one or more of the following: a NIC providing a wired interface, for example, an Ethernet NIC, where the Ethernet NIC may provide a copper wire interface and/or a fiber interface; or a NIC providing a wireless interface, for example, a WLANNIC.

The memory is configured to store program code.

The memory may be a volatile memory, for example, a random-access memory; or a non-volatile memory, for example, a flash memory, a hard disk drive, or a solid-state drive; or a combination of the foregoing types of memories.

The memory is configured to store program code.

The signal processor is configured to obtain, according to the program code stored in the memory, the metadata transmitted by the interface, and generate a metadata index value corresponding to the updated metadata.

The interface is further configured to obtain the metadata index value transmitted by the signal processor, and send the metadata index value to the UE.

The signal processor may be a CPU, or a combination of a CPU and a hardware chip. The signal processor may also be a network processor, or a combination of a CPU and an NP, or a combination of an NP and a hardware chip.

The hardware chip may be one or a combination of the following: an ASIC, an FPGA, and a CPLD.

Optionally, the signal processor is further configured to determine a code word for broadcasting by the UE; and specifically, the interface is specifically configured to send the code word and the metadata index value to the UE.

Specifically, the interface is specifically configured to receive a request message that is sent by the UE and used for metadata updating, where the request message includes the updated metadata; the signal processor is specifically configured to obtain stored code words; and the interface is specifically configured to send a response message, where the response message includes a code word same as one of the stored code words and the metadata index value corresponding to the updated metadata.

Specifically, the interface is specifically configured to receive a request message sent by the UE, where the request message includes the updated metadata, and the request message is used to request to obtain the code word for broadcasting; specifically, the signal processor is specifically configured to allocate the code word to the UE; and specifically, the interface is specifically configured to send a response message, where the response message includes the allocated code word and the metadata index value corresponding to the updated metadata.

In the foregoing technical solution provided by Embodiment 1 of the present disclosure, when a UE sends updated metadata of a service to a network side, the network side generates, according to the received updated metadata, a metadata index value corresponding to the updated metadata, determines a code word corresponding to the service, and sends the metadata index value together with the code word to the UE. The technical solution can be used to solve a problem that when service data is updated, a monitoring UE cannot accurately and effectively obtain updated service data provided by an announcing UE.

Embodiment 2

Figure 4:
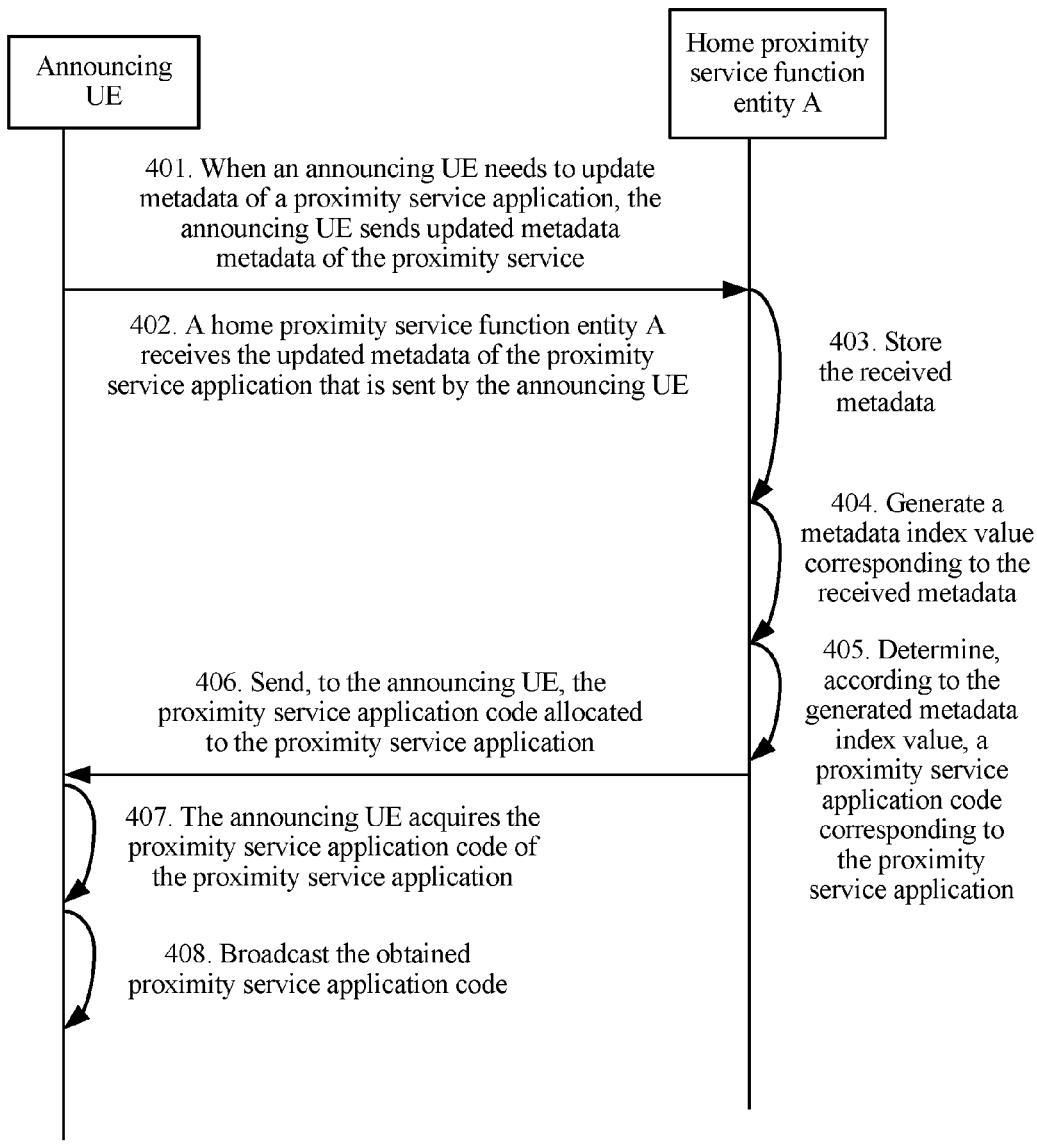
FIG. 4 is a flowchart of a data processing method according to Embodiment 2 of the present disclosure.

In a data processing method provided by Embodiment 2 of the present disclosure, a service information index value field is added to a ProSe application code broadcast by an announcing UE, where the service information index value is referred to as a metadata index value. The metadata index may be 2 to 3 bits. As shown in FIG. 4, a specific processing procedure of the method includes the following steps.

Step 401: When an announcing UE needs to update metadata of a proximity service application, the announcing UE sends updated metadata of the proximity service to a home ProSe function A that provides services for the announcing UE.

In an implementation manner, the announcing UE may send a first request message, where the first request message includes the updated metadata, and the first request message is used for metadata updating.

In an implementation manner, the announcing UE may send a second request message, where the second request message includes the updated metadata and is used to obtain a ProSe application code for broadcasting. The first request message and the second request message may be implemented by using a same message, or may be implemented by using different messages.

In specific implementation, in a proximity service, the first request message and the second request message may be implemented by using a discovery request.

If the first request message is implemented by using the discovery request, that is, the discovery request is used for metadata updating, a command field command in the discovery request may be set to metadata_update or null, for indicating that the first request message is used for metadata updating.

If the second request message is implemented by using the discovery request, that is, the discovery request is used to request a code word for broadcasting (for example, a ProSe application code), the command field command in the discovery request may be set to announce, for indicating that the second request message is used to request to obtain a code word for broadcasting (for example, a ProSe application code).

The discovery request may further include a proximity service application identity (ProSe application ID), an identity of the announcing UE, a service application identity (application ID) triggering the proximity service application, and the like. In the technical solution provided by Embodiment 2 of the present disclosure, the code word for broadcasting may be a ProSe application code in the proximity service.

Step 402: The home ProSe function A receives the updated metadata of the proximity service application that is sent by the announcing UE.

The home ProSe function A may receive the first request message, and obtain the updated metadata from the received first request message.

The home ProSe function A may receive the second request message, and obtain the updated metadata from the received second request message.

For the first request message and the second request message, reference may be made to detailed descriptions in the foregoing step 101, and details are not further described in this step.

Specifically, the home ProSe function A receives the discovery request sent by the announcing UE.

Step 403: The home ProSe function A stores the received metadata.

Step 404: The home ProSe function A generates a metadata index corresponding to the received metadata.

Step 1: The home ProSe function A determines whether a metadata index is stored. If a determining result is yes, performs step 2, or if a determining result is no, performs step 3.

Step 2: Update the existing metadata index, for example, add a specified numeric value, and generate the metadata index corresponding to the received metadata.

1 may be added to the specified numeric value in sequence, or the specified numeric value may be another numeric value such as 2 or 3, or may be a randomly generated numeric value or a set numeric value.

Step 3: If a determining result is no, the home ProSe function A generates the metadata index.

Step 405: The home ProSe function A determines, according to the generated metadata index, a ProSe application code corresponding to the proximity service application.

In an implementation manner, the first request message is used for metadata updating. Indication information for metadata updating may be included in the first request message to indicate that the first request message is used for metadata updating. The home ProSe function A obtains a ProSe application code stored in the UE context and corresponding to the proximity service application, replaces a metadata index field in the stored ProSe application code with the generated metadata index, and therefore generates a new ProSe application code for the announcing UE.

In this manner, the home ProSe function A receives the discovery request, and determines, according to a command field value in the discovery request, that the request message is used for metadata updating. That is, if the command field value is metadata-update or the command field is set to null, it represents an indication for metadata updating, and is used to indicate that the first request message is used for metadata updating. The home ProSe function A obtains the stored ProSe application code corresponding to the proximity service application, replaces the metadata index in the stored ProSe application code with the generated metadata index, and obtains a new ProSe application code corresponding to the proximity service application.

In this manner, the home ProSe function A generates the new ProSe application code for the proximity service based on the stored ProSe application code and the generated metadata index.

In another manner, the second request message sent by the announcing UE is received, where the second request message is used to request to obtain a code word for broadcasting (for example, the ProSe application code provided by Embodiment 1 of the present disclosure). The home ProSe function A allocates a ProSe application code to the service application according to the second request message.

If the second request message is implemented by using the discovery request, in this manner, the home ProSe function A determines the command field value in the discovery request according to the received discovery request; and if the command field value is announce, the home ProSe function A generates a new ProSe application code for the proximity service.

In specific implementation, the home ProSe function A allocates a temporary identity part in the ProSe application code to the proximity service, and generates a new ProSe application code by using the allocated temporary identity and the generated metadata index, that is, the generated ProSe application code includes at least the allocated temporary identity, the generated metadata index, a mobile country code, and a mobile network code. The temporary identity refers to a part of the ProSe application code except the metadata index, the mobile country code, and the mobile network code, and is a code word corresponding to a service identity name.

Step 406: The home ProSe function A sends, to the announcing UE, the ProSe application code allocated to the proximity service application.

In an implementation manner, the home ProSe function A sends a first response message, where the first response message includes the ProSe application code of the proximity service application.

In an implementation manner, the home ProSe function A sends a second response message, where the second response message includes the ProSe application code of the proximity service application.

The first response message and the second response message may be a same message, or may be different messages. In addition, if the first response message and the second response message are different messages, the ProSe application code of the proximity service application, included in the first response message and the second response message, is allocated to the proximity service application according to different manners. The first response message corresponds to the foregoing first request message, and the second response message corresponds to the foregoing second request message.

In the technical solution provided by Embodiment 2 of the present disclosure, the first response message or the second response message may be implemented by using a discovery response. In specific implementation, the home ProSe function A sends a discovery response, where the discovery response includes the ProSe application code of the proximity service application and a validity timer corresponding to the ProSe application code.

Step 407: The announcing UE obtains the ProSe application code of the proximity service application.

In an implementation manner, the announcing UE receives the first response message, and obtains the ProSe application code of the proximity service application from the first response message.

In this manner, the ProSe application code of the proximity service application is the new ProSe application code sent to the announcing UE after the home ProSe function A receives the first request message, replaces the metadata index value field in the stored ProSe application code with the generated metadata index value, and generates the new ProSe application code.

In an implementation manner, the ProSe application code of the proximity service application is obtained from the received second response message, where the ProSe application code is allocated by the home ProSe function A to the proximity service of the announcing UE when the home ProSe function A receives the second request message. In specific implementation, for the temporary identity part in the ProSe application code, a new ProSe application code is generated by using the allocated temporary identity and the generated metadata index.

Step 408: The announcing UE broadcasts the obtained ProSe application code.

A message broadcast by the announcing UE includes the obtained ProSe application code.

Correspondingly, Embodiment 2 of the present disclosure provides a data processing method. A specific processing procedure of the method is as follows:

Step 1: A UE sends updated metadata.

Step 2: Obtain a code word for broadcasting, where the code word includes a metadata index value corresponding to the updated metadata.

Step 3: Broadcast the obtained code word.

A manner of sending the updated metadata by the UE may be: sending, by the UE, a request message, where the request message includes the updated metadata, and the request message is used for metadata updating; and the obtaining a code word for broadcasting includes: receiving, by the UE, a response message; and obtaining, from the response message, the code word for broadcasting, where the code word is generated by a network side after the network side generates the metadata index value according to the received updated metadata and replaces a metadata index value in a stored code word with the generated metadata index value.

A manner may be: sending, by the UE, a request message, where the request message includes the updated metadata, and the request message is used to request to obtain the code word for broadcasting; and the obtaining the code word for broadcasting includes: receiving, by the UE, a response message; and obtaining, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

Correspondingly, Embodiment 2 of the present disclosure provides a data processing apparatus whose structure is consistent with that in FIG. 2*a*. The data processing apparatus includes: a sending module, configured to send updated metadata; an obtaining module, configured to obtain a code word for broadcasting, where the code word includes a metadata index value corresponding to the updated metadata; and a broadcasting module, configured to broadcast the obtained code word.

Specifically, the sending module is specifically configured to send a request message, where the request message includes the updated metadata, and the request message is used for metadata updating; and specifically, the obtaining module is specifically configured to receive a response message, and obtain, from the response message, the code word for broadcasting, where the code word is generated by a network side after the network side generates the metadata index value according to the received updated metadata and replaces a metadata index value in a stored code word with the generated metadata index value.

Specifically, the sending module is specifically configured to send a request message, where the request message includes the updated metadata, and the request message is used to request to obtain the code word for broadcasting; and specifically, the obtaining module is specifically configured for the UE to receive a response message, and obtain, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

Correspondingly, Embodiment 2 of the present disclosure provides a data processing device whose structure is the same as that shown in FIG. 2*b*. The data processing device includes: an interface, configured to send updated metadata; a memory, configured to store a program instruction; and a signal processor, configured to obtain, according to the program instruction stored in the memory, a code word for broadcasting, where the code word includes a metadata index value corresponding to the updated metadata; where the interface is further configured to broadcast the obtained code word.

Specifically, the interface is specifically configured to send a request message, where the request message includes the updated metadata, and the request message is used for metadata updating; and specifically, the signal processor is specifically configured to receive a response message, and obtain, from the response message, the code word for broadcasting, where the code word is generated by a network side after the network side generates the metadata index value according to the received updated metadata and replaces a metadata index value in a stored code word with the generated metadata index value.

Specifically, the interface is specifically configured to send a request message, where the request message includes the updated metadata, and the request message is used to request to obtain the code word for broadcasting; and the signal processor is specifically configured for the UE to receive a response message, and obtain, from the response message, the code word for broadcasting, where the code word is generated by a network side by using the metadata index value and a temporary identity after the network side generates the corresponding metadata index value according to the received updated metadata and allocates, to the UE, the temporary identity in the code word for broadcasting.

Correspondingly, Embodiment 2 of the present disclosure provides a data processing method. A specific processing procedure of the method is as follows:

Step 1: Receive updated metadata sent by a user equipment UE.

Step 2: Generate a metadata index value corresponding to the updated metadata.

Step 3: Generate, by using the metadata index value, a code word for broadcasting by the UE.

Step 4: Send the generated code word.

A manner of receiving the updated metadata sent by the UE may be: receiving a request message that is sent by the UE and used for metadata updating, where the request message includes the updated metadata; the generating, by using the metadata index value, a code word for broadcasting by the UE, includes: obtaining a stored code word for broadcasting by the UE; and replacing a metadata index value in the obtained code word with the metadata index value, and generating the code word for broadcasting by the UE; and the sending the generated code word includes: sending a response message, where the response message includes the generated code word.

A manner of receiving the updated metadata sent by the UE may be: receiving a request message sent by the UE, where the request message includes the updated metadata, and the request message is used to request to obtain the code word for broadcasting; the generating, by using the metadata index value, a code word for broadcasting by the UE, includes: allocating, to the UE, a temporary identity in the code word for broadcasting, and generating, by using the metadata index value and the temporary identity, the code word for broadcasting by the UE; and the sending the generated code word includes: sending a response message, where the response message includes the generated code word.

Correspondingly, Embodiment 2 of the present disclosure provides a data processing apparatus whose structure is the same as that in FIG. 3a. The data processing apparatus includes: a receiving module, configured to receive updated metadata sent by a user equipment UE; a generation module, configured to generate a metadata index value corresponding to the updated metadata, and generate, by using the metadata index value, a code word for broadcasting by the UE; and a sending module, configured to send the generated code word.

Specifically, the receiving module is specifically configured to receive a request message that is sent by the UE and used for metadata updating, where the request message includes the updated metadata; specifically, the generation module is specifically configured to obtain a stored code word for broadcasting by the UE, replace a metadata index value in the obtained code word with the metadata index value, and generate the code word for broadcasting by the UE; and specifically, the sending module is specifically configured to send a response message, where the response message includes the generated code word.

Specifically, the receiving module is specifically configured to receive a request message sent by the UE, where the request message includes the updated metadata, and the request message is used to request to obtain the code word for broadcasting; specifically, the generation module is specifically configured to allocate, to the UE, a temporary identity in the code word for broadcasting, and generate, by using the metadata index value and the temporary identity, the code word for broadcasting by the UE; and specifically, the sending module is specifically configured to send a response message, where the response message includes the generated code word.

Correspondingly, Embodiment 2 of the present disclosure provides a data processing device whose structure is the same as that in FIG. 2b. The data processing device includes: an interface, configured to receive updated metadata sent by a user equipment UE; a memory, configured to store a program instruction; and a signal processor, configured to generate, according to the program instruction stored in the memory, a metadata index value corresponding to the updated metadata, and generate, by using the metadata index value, a code word for broadcasting by the UE; where the interface is further configured to send the generated code word.

Specifically, the interface is specifically configured to receive a request message that is sent by the UE and used for metadata updating, where the request message includes the updated metadata; specifically, the signal processor is specifically configured to obtain a stored code word for broadcasting by the UE, replace a metadata index value in the obtained code word with the metadata index value, and generate the code word for broadcasting by the UE; and specifically, the interface is specifically configured to send a response message, where the response message includes the generated code word.

Specifically, the interface is specifically configured to receive a request message sent by the UE, where the request message includes the updated metadata, and the request message is used to request to obtain the code word for broadcasting; specifically, the signal processor is specifically configured to allocate, to the UE, a temporary identity in the code word for broadcasting, and generate, by using the metadata index value and the temporary identity, the code word for broadcasting by the UE; and specifically, the interface is specifically configured to send a response message, where the response message includes the generated code word.

In the foregoing technical solution provided by Embodiment 2 of the present disclosure, when a UE sends updated metadata of a service to a network side, the network side generates, according to the received updated metadata, a metadata index value corresponding to the updated metadata, determines a code word corresponding to the service, and sends the code word to the UE. The technical solution can be used to solve a problem that when service data is updated, a monitoring UE cannot accurately and effectively obtain updated service data provided by an announcing UE.

Embodiment 3

Figure 5A:
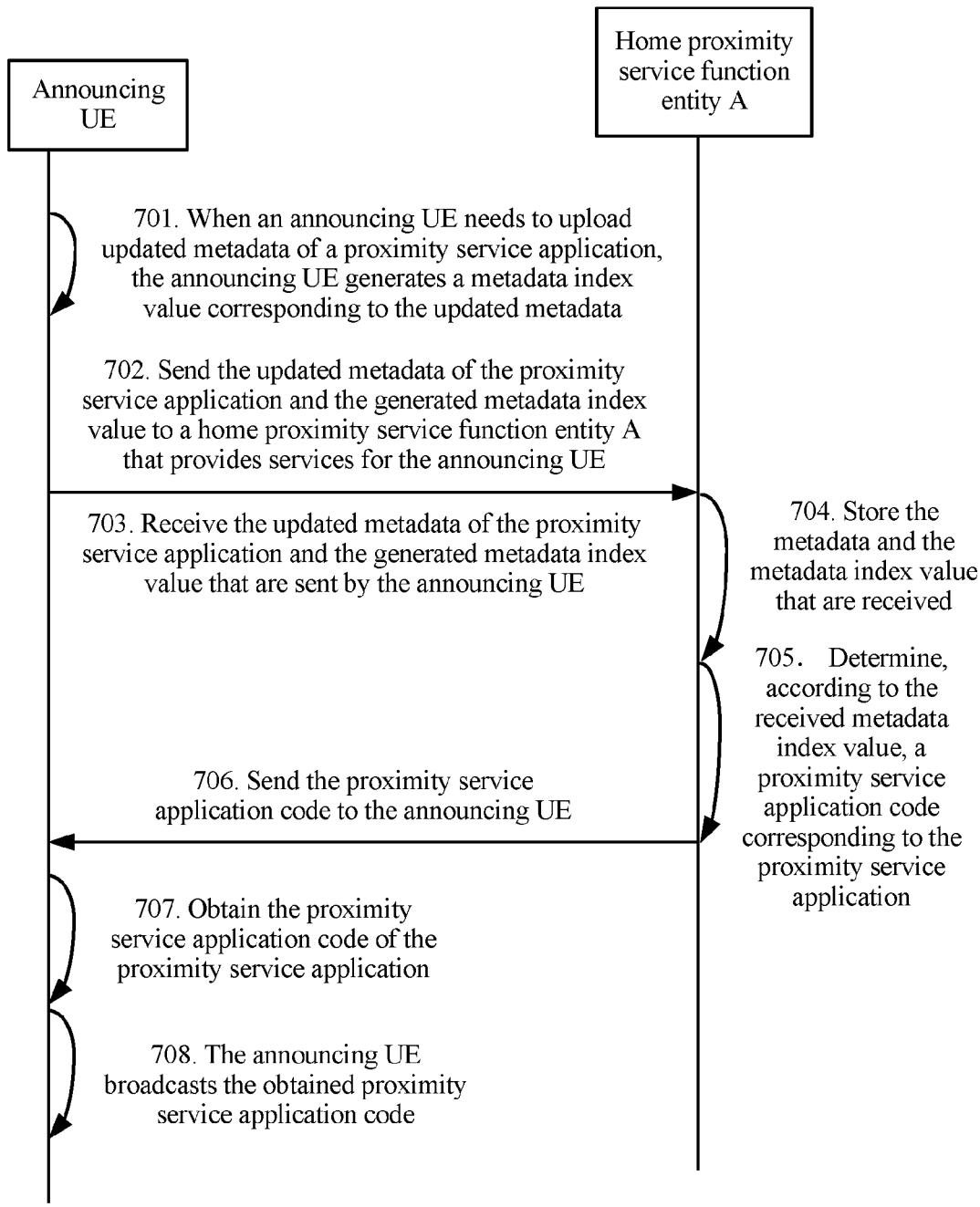
FIG. 5a is a flowchart of a data processing method according to Embodiment 3 of the present disclosure.

Embodiment 3 of the present disclosure provides a data processing method. As shown in FIG. 5a, a specific processing procedure of the method includes the following steps.

Step 701: When an announcing UE needs to upload updated metadata of a proximity service application, the announcing UE generates a metadata index value corresponding to the updated metadata.

Figure 5B:
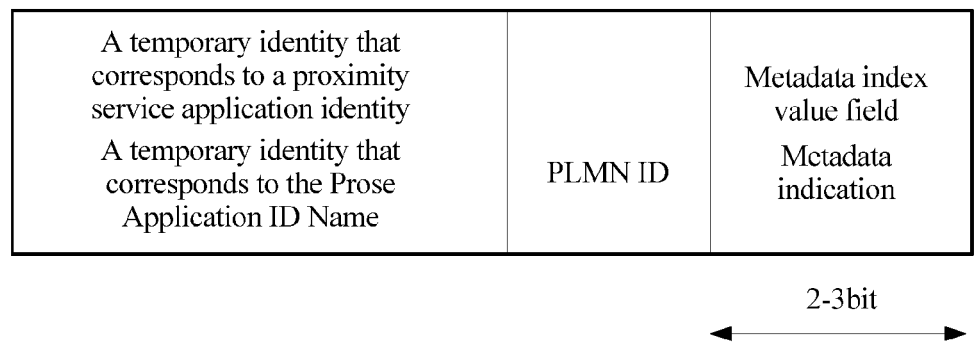
FIG. 5b is a schematic structural diagram of a ProSe application code field according to an embodiment of the present disclosure.

In the technical solution provided by Embodiment 3 of the present disclosure, a service information index value field is added to a ProSe application code broadcast by the announcing UE, where the service information index value is referred to as a metadata index value. Specifically as shown in FIG. 5b, the metadata index may be 2 to 3 bits.

The announcing UE generates, according to the following specific procedure, the metadata index corresponding to the updated metadata:

Step 1: The announcing UE determines whether a metadata index exists in a ProSe application code. If a determining result is yes, performs step 2, or if a determining result is no, performs step 3.

Step 2: Update the existing metadata index. For example, by adding a specified numeric value, the metadata index corresponding to the updated metadata is generated.

1 may be added to the specified numeric value in sequence, or the specified numeric value may be another numeric value such as 2 or 3, or may be a randomly generated numeric value or a set numeric value.

Step 3: If a determining result is no, the announcing UE generates the metadata index.

Step 702: The announcing UE sends, to a home ProSe function A that provides services for the announcing UE, the updated metadata of the proximity service application and the generated metadata index.

In an implementation manner, the announcing UE may send a first request message, where the first request message is used for metadata updating. The first request message includes the updated metadata and the generated metadata index.

In an implementation manner, the announcing UE may send a second request message, where the second request message is used to request to obtain a code word for broadcasting. The second request message includes the updated metadata and the generated metadata index.

The first request message and the second request message may be implemented by using a same message, or may be implemented by using different messages.

In specific implementation, in a proximity service, the first request message and the second request message may be implemented by using a discovery request.

If the first request message is implemented by using the discovery request, that is, the discovery request is used for metadata updating, a command field command in the discovery request may be set to metadata_update or null, for indicating that the first request message is used for metadata updating.

If the second request message is implemented by using the discovery request, that is, the discovery request is used to request a code word for broadcasting (for example, a ProSe application code), the command field command in the discovery request may be set to announce, for indicating that the second request message is used to request to obtain a code word for broadcasting (for example, a ProSe application code).

The discovery request may further include a proximity service application identity (ProSe application ID), an identity of the announcing UE, and a service application identity (application ID) triggering the service application. In the technical solution provided by Embodiment 3 of the present disclosure, the code word for broadcasting may be a ProSe application code in the proximity service.

Step 703: The home ProSe function A receives the updated metadata of the proximity service application and the generated metadata index that are sent by the announcing UE.

In an implementation manner, the home ProSe function A may receive the first request message, and obtain the updated metadata and the metadata index from the received first request message.

In an implementation manner, the home ProSe function A may receive the second request message, and obtain the updated metadata and the metadata index from the received second request message.

For the first request message and the second request message, reference may be made to detailed descriptions in the foregoing step, and details are not further described in this step.

In specific implementation, the home ProSe function A receives the discovery request sent by the announcing UE. The discovery request includes the updated metadata and the generated metadata index.

Step 704: The home ProSe function A stores the metadata and the metadata index that are received.

Step 705: The home ProSe function A determines, according to the received metadata index, a ProSe application code corresponding to the proximity service application.

In an implementation manner, the first request message is used for metadata updating. Indication information for metadata updating may be included in the first request message to indicate that the first request message is used for metadata updating. The home ProSe function A obtains a ProSe application code stored in the UE context and corresponding to the proximity service application, replaces a metadata index in the stored ProSe application code with the received metadata index, and generates a new ProSe application code corresponding to the proximity service application.

In this manner, the home ProSe function A generates the new ProSe application code for the proximity service based on the stored ProSe application code and the received metadata index.

Specifically, the home ProSe function A receives the discovery request, and determines, according to a command field value in the discovery request, that the request message is used for metadata updating. That is, if the command field value is metadata-update or the command field is set to null, it represents an indication for metadata updating, and is used to indicate that the first request message is used for metadata updating. The home ProSe function A obtains the stored ProSe application code corresponding to the proximity service application, determines the metadata index in the stored ProSe application code, replaces the metadata index in the stored ProSe application code with the received metadata index sent by the announcing UE, and obtains the ProSe application code corresponding to the proximity service application.

In an implementation manner, the second request message sent by the announcing UE is received, where the second request message is used to request to obtain a code word for broadcasting (for example, the ProSe application code provided by the embodiment of the present disclosure). The home ProSe function A allocates a new ProSe application code to the service application according to the second request message by using the received metadata index.

If the second request message is implemented by using the discovery request, in this manner, it may be determined, according to the command field value in the discovery request, that the request message is used to obtain a ProSe application code for broadcasting. That is, if the command field value is announce, which is used to indicate that the second request message is used to obtain a ProSe application code for broadcasting, the home ProSe function A generates a new ProSe application code for the proximity service application. In specific implementation, the home ProSe function A allocates a temporary identity part in the ProSe application code to the proximity service, and generates a new ProSe application code by using the allocated temporary identity and the received metadata index, that is, the generated ProSe application code includes at least the allocated temporary identity, the received metadata index, a mobile country code, and a mobile network code. The temporary identity a part of the ProSe application code except the metadata index, the mobile country code, and the mobile network code, and is a code word corresponding to a service identity name.

Step 706: The home ProSe function A sends the ProSe application code to the announcing UE.

In an implementation manner, the home ProSe function A sends a first response message, where the first response message includes the ProSe application code of the proximity service application.

In an implementation manner, the home ProSe function A sends a second response message, where the second response message includes the ProSe application code of the proximity service application.

The first response message and the second response message may be implemented by using a same message, or may be implemented by using different messages. The first response message corresponds to the foregoing first request message, and the second response message corresponds to the foregoing second request message.

In the technical solution provided by the embodiment of the present disclosure, the first response message or the second response message may be implemented by using a discovery response. In specific implementation, the home ProSe function A sends a discovery response, where the discovery response includes the ProSe application code of the proximity service application and a validity timer corresponding to the ProSe application code.

Step 707: The announcing UE obtains the ProSe application code of the proximity service application.

In an implementation manner, the announcing UE receives the first response message, and obtains the ProSe application code of the proximity service application from the first response message.

In this manner, the ProSe application code of the proximity service application is the replaced ProSe application code sent to the announcing UE after the home ProSe function A replaces, according to the received first request message, the metadata index value field in the stored ProSe application code with the new metadata index value generated by the announcing UE.

In an implementation manner, the ProSe application code of the proximity service application is obtained from the received second response message, where the ProSe application code is allocated by the home ProSe function A to the proximity service application according to the received second request message.

In specific implementation, the home ProSe function A allocates a temporary identity part in the ProSe application code to the proximity service, and generates a new ProSe application code by using the allocated temporary identity and the received metadata index.

Another possible implementation manner of this step may be further: the announcing UE generates a new ProSe application code according to the metadata index value corresponding to the generated metadata. In this manner, steps 705 and 706 do not need to be performed. A specific implementation manner is: the announcing UE replaces the metadata index value field in the stored ProSe application code with the generated metadata index value, and therefore obtains the ProSe application code; another specific implementation manner is: the announcing UE obtains a ProSe application code from a network, replaces a metadata index value field in the obtained ProSe application code with the generated metadata index value, and therefore obtains the ProSe application code.

Step 708: The announcing UE broadcasts the obtained ProSe application code.

A message broadcast by the announcing UE includes the obtained ProSe application code.

Correspondingly, Embodiment 3 of the present disclosure provides a data processing method. A specific processing procedure of the method is as follows:

Step 1: When a UE needs to update metadata, the UE generates a metadata index value corresponding to the updated data.

Step 2: Send the updated metadata and the metadata index value.

Step 3: Obtain a code word for broadcasting.

Step 4: Broadcast the obtained code word, where the code word includes the metadata index value.

A manner of sending the updated metadata and the metadata index value is: sending, by the UE, a request message, where the request message includes the updated metadata and the metadata index value, and the request message is used for metadata updating; and the obtaining a code word for broadcasting includes: receiving, by the UE, a response message; and obtaining the code word from the received response message, where the code word is generated by a network side by replacing a metadata index value in a stored code word with the metadata index value in the request message.

A manner of sending the updated metadata and the metadata index value is: sending, by the UE, a request message, where the request message includes the updated metadata and the metadata index value, and the request message is used to request to obtain the code word for broadcasting; and the obtaining a code word for broadcasting includes: receiving, by the UE, a response message; and obtaining the code word from the received response message, where the code word is generated by a network side by using the metadata index value in the request message and a temporary identity after the network side allocates, to the UE, the temporary identity in the code word for broadcasting.

Figure 6A:
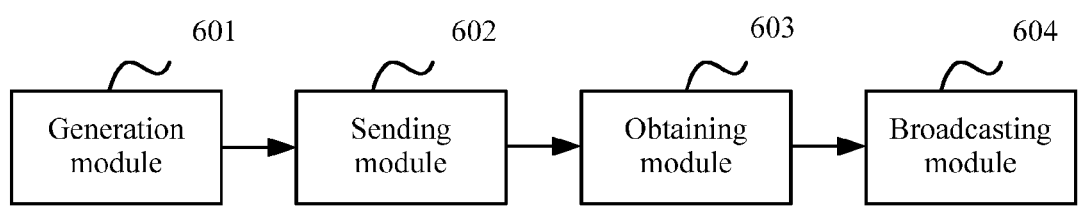
FIG. 6a is a schematic structural diagram of a data processing apparatus according to Embodiment 3 of the present disclosure.

Correspondingly, the embodiment of the present disclosure provides a data processing apparatus, as shown in FIG. 6a, including: a generation module 601, configured to generate, if metadata needs to be updated, a metadata index value corresponding to the updated metadata; a sending module 602, configured to send the updated metadata and the metadata index value; an obtaining module 603, configured to obtain a code word for broadcasting; and a broadcasting module 604, configured to broadcast the obtained code word, where the code word includes the metadata index value.

Specifically, the sending module 602 is specifically configured to send a request message, where the request message includes the updated metadata and the metadata index value, and the request message is used for metadata updating; and the obtaining module 603 is specifically configured for the UE to receive a response message, and obtain the code word from the received response message, where the code word is generated by a network side by replacing a metadata index value in a stored code word with the metadata index value in the request message.

Specifically, the sending module 602 is specifically configured to send a request message, where the request message includes the updated metadata and the metadata index value, and the request message is used to request to obtain the code word for broadcasting; and the obtaining module 603 is specifically configured to receive a response message, and obtain the code word from the received response message, where the code word is generated by a network side by using the metadata index value in the request message and a temporary identity after the network side allocates, to the UE, the temporary identity in the code word for broadcasting.

Correspondingly, the embodiment of the present disclosure provides a data processing device whose structure is the same as that in FIG. 2*b*. The data processing device includes: a memory, configured to store program code; a signal processor, configured to generate, according to the program code stored in the memory, if metadata needs to be updated, a metadata index value corresponding to the updated metadata; and an interface, configured to send the updated metadata and the metadata index value; where the signal processor is further configured to obtain a code word for broadcasting; and the interface is further configured to broadcast the obtained code word, where the code word includes the metadata index value.

Specifically, the interface is specifically configured to send a request message, where the request message includes the updated metadata and the metadata index value, and the request message is used for metadata updating; and the signal processor is specifically configured for the UE to receive a response message, and obtain the code word from the received response message, where the code word is generated by a network side by replacing a metadata index value in a stored code word with the metadata index value in the request message.

Specifically, the interface is specifically configured to send a request message, where the request message includes the updated metadata and the metadata index value, and the request message is used to request to obtain the code word for broadcasting; and the signal processor is specifically configured to receive a response message, and obtain the code word from the received response message, where the code word is generated by a network side by using the metadata index value in the request message and a temporary identity after the network side allocates, to the UE, the temporary identity in the code word for broadcasting.

Correspondingly, Embodiment 3 of the present disclosure provides a data processing method. A specific processing procedure of the method includes the following steps.

Step 1: Receive updated metadata and a metadata index value corresponding to the updated metadata that are sent by a UE, where the metadata index value is a metadata index value corresponding to the updated metadata and generated by the UE when the UE needs to update metadata.

Step 2: Generate, by using the received metadata index value, a code word for broadcasting by the UE.

Step 3: Send the generated code word.

A manner of receiving the updated metadata and the metadata index value corresponding to the updated metadata that are sent by the UE may be: receiving a request message sent by the UE, where the request message includes the updated metadata and the metadata index value, and the request message is used for metadata updating; the generating, by using the received metadata index value, a code word for broadcasting by the UE, includes: determining a stored code word of the UE; and replacing a metadata index value in the stored code word with the received metadata index value, and generating the code word for broadcasting by the UE; and the sending the generated code word includes: sending a response message, where the response message includes the generated code word.

A manner of receiving the updated metadata and the metadata index value corresponding to the updated metadata that are sent by the UE may be: receiving a request message sent by the UE, where the request message includes the updated metadata and the metadata index value, and the request message is used to request to obtain the code word for broadcasting; the generating, by using the received metadata index value, a code word for broadcasting by the UE, includes: allocating, to the UE, a temporary identity in the code word for broadcasting, and generating, by using the metadata index value in the request message and the temporary identity, the code word for broadcasting by the UE; and the sending the generated code word includes: sending a response message, where the response message includes the generated code word.

Correspondingly, Embodiment 3 of the present disclosure provides a data processing apparatus whose structure is the same as that in FIG. 3*a*. The data processing apparatus includes: a receiving module, configured to receive updated metadata and a metadata index value corresponding to the updated metadata that are sent by a user equipment UE, where the metadata index value is a metadata index value corresponding to the updated metadata and generated by the UE when the UE needs to update metadata; a generation module, configured to generate, by using the received metadata index value, a code word for broadcasting by the UE; and a sending module, configured to send the generated code word.

Specifically, the receiving module is specifically configured to receive a request message sent by the UE, where the request message includes the updated metadata and the metadata index value, and the request message is used for metadata updating; specifically, the generation module is specifically configured to determine a stored code word of the UE, replace a metadata index value in the stored code word with the received metadata index value, and generate the code word for broadcasting by the UE; and specifically, the sending module is specifically configured to send a response message, where the response message includes the generated code word.

Specifically, the receiving module is specifically configured to receive a request message sent by the UE, where the request message includes the updated metadata and the metadata index value, and the request message is used to request to obtain the code word for broadcasting; specifically, the generation module is specifically configured to allocate, to the UE, a temporary identity in the code word for broadcasting, and generate, by using the metadata index value in the request message and the temporary identity, the code word for broadcasting by the UE; and specifically, the sending module is specifically configured to send a response message, where the response message includes the generated code word.

Correspondingly, the embodiment of the present disclosure provides a data processing device whose structure is consistent with that in FIG. 2*b*. The data processing device includes: an interface, configured to receive updated metadata and a metadata index value corresponding to the updated metadata that are sent by a user equipment UE, where the metadata index value is a metadata index value corresponding to the updated metadata and generated by the UE when the UE needs to update metadata; a memory, configured to store program code; a signal processor, configured to generate, according to the program code stored in the memory and by using the received metadata index value, a code word for broadcasting by the UE; where the interface is further configured to send the generated code word.

Specifically, the interface is specifically configured to receive a request message sent by the UE, where the request message includes the updated metadata and the metadata index value, and the request message is used for metadata updating; specifically, the signal processor is specifically configured to determine a stored code word of the UE, replace a metadata index value in the stored code word with the received metadata index value, and generate the code word for broadcasting by the UE; and specifically, the interface is specifically configured to send a response message, where the response message includes the generated code word.

Specifically, the interface is specifically configured to receive a request message sent by the UE, where the request message includes the updated metadata and the metadata index value, and the request message is used to request to obtain the code word for broadcasting; specifically, the signal processor is specifically configured to allocate, to the UE, a temporary identity in the code word for broadcasting, and generate, by using the metadata index value in the request message and the temporary identity, the code word for broadcasting by the UE; and specifically, the interface is specifically configured to send a response message, where the response message includes the generated code word.

In the foregoing technical solution provided by Embodiment 3 of the present disclosure, when a UE needs to send updated metadata of a service to a network side, the UE generates a metadata index value corresponding to the updated metadata, and sends the updated metadata and the generated metadata index value to the network side; the network side determines, according to the received metadata index value, a code word corresponding to the service, and sends the generated code word to the UE. The technical solution can be used to solve a problem that when service data is updated, a monitoring UE cannot accurately and effectively obtain updated service data provided by an announcing UE.

Embodiment 4

Figure 7:
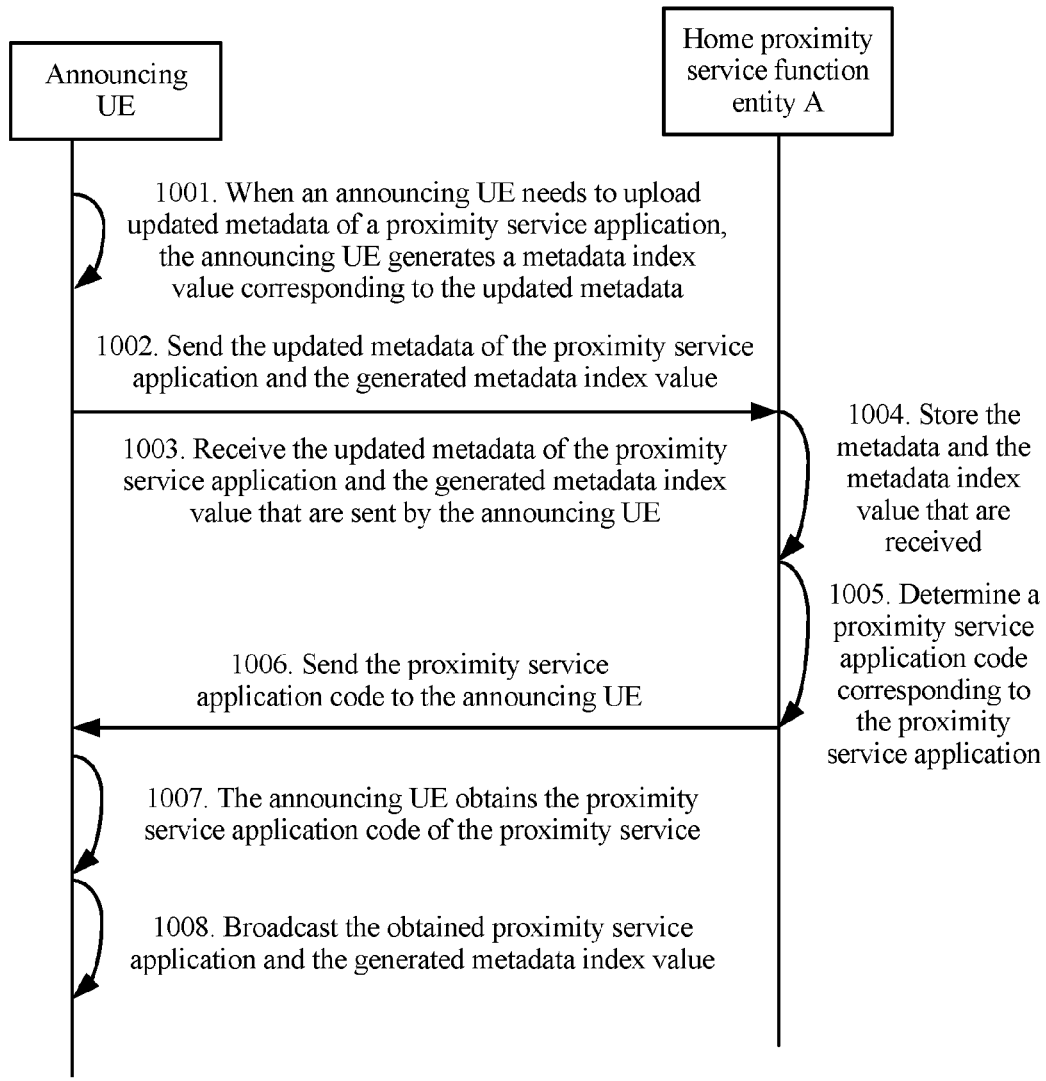
FIG. 7 is a flowchart of a data processing method according to Embodiment 4 of the present disclosure.

Embodiment 4 of the present disclosure provides a data processing method. As shown in FIG. 7, a specific processing procedure of the method includes the following steps.

Step 1001: When an announcing UE needs to upload updated metadata of a proximity service application, the announcing UE generates a metadata index value corresponding to the updated metadata.

The announcing UE generates, according to the following specific procedure, the metadata index corresponding to the updated metadata:

Step 1: The announcing UE determines whether a metadata index exists in a ProSe application code. If a determining result is yes, performs step 2, or if a determining result is no, performs step 3.

Step 2: Update the existing metadata index. For example, by adding a specified numeric value, the metadata index corresponding to the updated metadata is generated.

1 may be added to the specified numeric value in sequence, or the specified numeric value may be another numeric value such as 2 or 3, or may be a randomly generated numeric value or a set numeric value.

Step 3: If a determining result is no, the announcing UE generates the metadata index.

Step 1002: The announcing UE sends, to a home ProSe function A that provides services for the announcing UE, the updated metadata of the proximity service application and the generated metadata index.

In an implementation manner, the announcing UE may send a first request message, where the first request message is used for metadata updating. The first request message includes the updated metadata and the generated metadata index.

In an implementation manner, the announcing UE may send a second request message, where the second request message is used to request to obtain a code word for broadcasting. The second request message includes the updated metadata and the generated metadata index.

The first request message and the second request message may be implemented by using a same message, or may be implemented by using different messages.

In specific implementation, in a proximity service, the first request message and the second request message may be implemented by using a discovery request.

If the first request message is implemented by using the discovery request, that is, the discovery request is used for metadata updating, a command field command in the discovery request may be set to metadata_update or null, for indicating that the first request message is used for metadata updating.

If the second request message is implemented by using the discovery request, that is, the discovery request is used to request a code word for broadcasting (for example, a ProSe application code), the command field command in the discovery request may be set to announce, for indicating that the second request message is used to request to obtain a code word for broadcasting (for example, a ProSe application code).

The discovery request may further include a ProSe application ID, an identity of the announcing UE, a service application ID triggering the proximity service application, and the like. In the technical solution provided by Embodiment 4 of the present disclosure, the code word for broadcasting may be a ProSe application code in the proximity service.

Step 1003: The home ProSe function A receives the updated metadata of the proximity service application and the generated metadata index that are sent by the announcing UE.

In an implementation manner, the home ProSe function A may receive the first request message sent by the announcing UE, where the first request message includes the updated metadata and the generated metadata index.

In an implementation manner, the home ProSe function A may receive the second request message sent by the announcing UE, where the second request message includes the updated metadata and the generated metadata index.

For the first request message and the second request message, reference may be made to detailed descriptions in the foregoing step, and details are not further described in this step.

In specific implementation, the home ProSe function A receives the discovery request sent by the announcing UE. The discovery request includes the updated metadata and the generated metadata index.

Step 1004: The home ProSe function A stores the metadata and the metadata index that are received.

Step 1005: The home ProSe function A determines a ProSe application code corresponding to the proximity service application.

In an implementation manner, the first request message is used for metadata updating. Indication information for metadata updating may be included in the first request message to indicate that the first request message is used for metadata updating. The home ProSe function A obtains a ProSe application code stored in the UE context and corresponding to the proximity service application, and allocates, to the UE, a ProSe application code same as the stored ProSe application code corresponding to the proximity service application.

In this manner, the home ProSe function A receives the discovery request, and determines, according to a command field value in the discovery request, that the request message is used for metadata updating. That is, if the command field value is metadata-update or the command field is set to null, it represents an indication for metadata updating, and is used to indicate that the first request message is used for metadata updating. The home ProSe function A obtains the stored ProSe application code corresponding to the proximity service application, and allocates, to the UE, the ProSe application code same as the stored ProSe application code corresponding to the proximity service application.

In an implementation manner, the second request message sent by the announcing UE is received, where the second request message is used to request to obtain a code word for broadcasting (for example, the ProSe application code provided by the embodiment of the present disclosure). The home ProSe function A allocates a corresponding ProSe application code to the service application according to the second request message.

If the second request message is implemented by using the discovery request, in this manner, the home ProSe function A may determine, according to the command field value in the discovery request, that the request message is used to obtain a ProSe application code for broadcasting. That is, if the command field value is announce, which is used to indicate that the second request message is used to obtain a ProSe application code for broadcasting, the home ProSe function A generates a new ProSe application code for the proximity service application.

Step 1006: The home ProSe function A sends the ProSe application code to the announcing UE.

In an implementation manner, the home ProSe function A sends a first response message, where the first response message includes the ProSe application code of the proximity service application.

In an implementation manner, the home ProSe function A sends a second response message, where the second response message includes the ProSe application code of the proximity service application.

The first response message and the second response message may be implemented by using a same message, or may be implemented by using different messages. The first response message corresponds to the foregoing first request message, and the second response message corresponds to the foregoing second request message.

In the technical solution provided by the embodiment of the present disclosure, the first response message or the second response message may be implemented by using a discovery response. In specific implementation, the home ProSe function A sends a discovery response, where the discovery response includes the ProSe application code of the proximity service application and a validity timer corresponding to the ProSe application code.

Step 1007: The announcing UE obtains the ProSe application code of the proximity service.

In an implementation manner, the announcing UE receives the first response message, and obtains the ProSe application code of the proximity service application from the first response message.

In this manner, the ProSe application code of the proximity service application is the ProSe application code that is allocated by the home ProSe function A to the UE according to the received first request message and is the same as the stored ProSe application code corresponding to the proximity service application.

In an implementation manner, the ProSe application code of the proximity service application is obtained from the received second response message, where the ProSe application code is the new ProSe application code allocated by the home ProSe function A to the proximity service application according to the received second request message.

Step 1008: The announcing UE broadcasts the obtained ProSe application code and the generated metadata index value.

A message broadcast by the announcing UE includes the obtained ProSe application code and the generated metadata index value.

Correspondingly, Embodiment 4 of the present disclosure provides a data processing method. A specific processing procedure of the method is as follows:

Step 1: When a user equipment UE needs to update metadata, the UE generates a metadata index value corresponding to the updated metadata.

Step 2: Send the updated metadata and the metadata index value.

Step 3: Obtain a code word for broadcasting.

Step 4: Broadcast the obtained code word and the metadata index value.

An implementation manner of sending the updated metadata and the metadata index value includes: sending, by the UE, a request message, where the request message includes the updated metadata and the metadata index value, and the request message is used for metadata updating; and the obtaining a code word for broadcasting includes: receiving, by the UE, a response message; and obtaining, from the received response message, the code word for broadcasting, where the code word is a code word same as one of code words stored by a network side.

An implementation manner of sending the updated metadata and the metadata index value includes: sending, by the UE, a request message, where the request message includes the updated metadata and the metadata index value, and the request message is used to request to obtain the code word for broadcasting; and the obtaining a code word for broadcasting includes: receiving, by the UE, a response message; and obtaining, from the received response message, the code word for broadcasting, where the code word is a code word allocated by a network side to the UE.

Correspondingly, the embodiment of the present disclosure provides a data processing apparatus whose structure is consistent with that in FIG. 6*a*. The data processing apparatus includes: a generation module, configured to generate, if metadata needs to be updated, a metadata index value corresponding to the updated metadata; a sending module, configured to send the updated metadata and the metadata index value; an obtaining module, configured to obtain a code word for broadcasting; and a broadcasting module, configured to broadcast the obtained code word and the metadata index value.

Specifically, the sending module is specifically configured to send a request message, where the request message includes the updated metadata and the metadata index value, and the request message is used for metadata updating; and the obtaining module is specifically configured to receive a response message, and obtain, from the received response message, the code word for broadcasting, where the code word is a code word same as one of code words stored by a network side.

Specifically, the sending module is specifically configured to send a request message, where the request message includes the updated metadata and the metadata index value, and the request message is used to request to obtain the code word for broadcasting; and the obtaining module is specifically configured to receive a response message, and obtain, from the received response message, the code word for broadcasting, where the code word is a code word allocated by a network side to the UE.

Correspondingly, the embodiment of the present disclosure provides a data processing device whose structure is the same as that in FIG. 2b. The data processing device includes: a memory, configured to store program code; a signal processor, configured to generate, if metadata needs to be updated, a metadata index value corresponding to the updated metadata; and an interface, configured to send the updated metadata and the metadata index value; where the signal processor is further configured to obtain a code word for broadcasting; and the interface is further configured to broadcast the obtained code word and the metadata index value.

Specifically, the interface is specifically configured to send a request message, where the request message includes the updated metadata and the metadata index value, and the request message is used for metadata updating; and specifically, the signal processor is specifically configured to receive a response message, and obtain, from the received response message, the code word for broadcasting, where the code word is a code word same as one of code words stored by a network side.

Specifically, the interface is specifically configured to send a request message, where the request message includes the updated metadata and the metadata index value, and the request message is used to request to obtain the code word for broadcasting; and specifically, the signal processor is specifically configured to receive a response message, and obtain, from the received response message, the code word for broadcasting, where the code word is a code word allocated by a network side to the UE.

Correspondingly, the embodiment of the present disclosure provides a data processing method. A specific processing procedure of the method is as follows:

Step 1: Receive updated metadata and a metadata index value corresponding to the updated metadata that are sent by a user equipment UE, where the metadata index value is a metadata index value corresponding to the updated metadata and generated by the UE when the UE needs to update metadata.

Step 2: Determine a code word for broadcasting by the UE.

Step 3: Send the determined code word.

A manner of receiving the updated metadata and the metadata index value corresponding to the updated metadata that are sent by the UE includes: receiving a request message sent by the UE, where the request message includes the updated metadata and the metadata index value, and the request message is used for metadata updating; the determining a code word for broadcasting by the UE includes: obtaining stored code words for broadcasting by the UE; and the sending the determined code word includes: sending a response message, where the response message includes a code word same as one of the stored code words that are obtained.

A manner of receiving the updated metadata and the metadata index value corresponding to the updated metadata that are sent by the UE includes: receiving a request message sent by the UE, where the request message includes the updated metadata and the metadata index value, and the request message is used to request to obtain the code word for broadcasting; the determining a code word for broadcasting by the UE includes: allocating the code word to the UE; and the sending the determined code word includes: sending a response message, where the response message includes the allocated code word.

Figure 8:
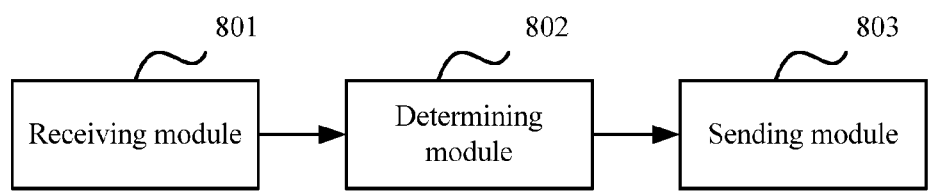
FIG. 8 is a schematic structural diagram of a data processing apparatus according to Embodiment 4 of the present disclosure.

Correspondingly, Embodiment 4 of the present disclosure provides a data processing apparatus, as shown in FIG. 8, including: a receiving module 801, configured to receive updated metadata and a metadata index value corresponding to the updated metadata that are sent by a user equipment UE, where the metadata index value is a metadata index value corresponding to the updated metadata and generated by the UE when the UE needs to update metadata; a determining module 802, configured to determine a code word for broadcasting by the UE; and a sending module 803, configured to send the determined code word.

Specifically, the receiving module 801 is specifically configured to receive a request message sent by the UE, where the request message includes the updated metadata and the metadata index value, and the request message is used for metadata updating; the determining module 802 is specifically configured to obtain stored code words for broadcasting by the UE; and the sending module 803 is specifically configured to send a response message, where the response message includes a code word same as one of the stored code words that are obtained.

Specifically, the receiving module 801 is specifically configured to receive a request message sent by the UE, where the request message includes the updated metadata and the metadata index value, and the request message is used to request to obtain the code word for broadcasting; the determining module 802 is specifically configured to allocate the code word to the UE; and the sending module 803 is specifically configured to send a response message, where the response message includes the allocated code word.

Correspondingly, the embodiment of the present disclosure provides a data processing device whose structure is the same as that shown in FIG. 2b. The data processing device includes: an interface, configured to receive updated metadata and a metadata index value corresponding to the updated metadata that are sent by a user equipment UE, where the metadata index value is a metadata index value corresponding to the updated metadata and generated by the UE when the UE needs to update metadata; a memory, configured to store program code; and a signal processor, configured to determine a code word for broadcasting by the UE; where the interface is further configured to send the determined code word.

Specifically, the interface is specifically configured to receive a request message sent by the UE, where the request message includes the updated metadata and the metadata index value, and the request message is used for metadata updating; the signal processor is specifically configured to obtain stored code words for broadcasting by the UE; and the interface is specifically configured to send a response message, where the response message includes a code word same as one of the stored code words that are obtained.

Specifically, the interface is specifically configured to receive a request message sent by the UE, where the request message includes the updated metadata and the metadata index value, and the request message is used to request to obtain the code word for broadcasting; the signal processor is specifically configured to allocate the code word to the UE; and the interface is specifically configured to send a response message, where the response message includes the allocated code word.

In the foregoing technical solution provided by Embodiment 4 of the present disclosure, when a UE needs to send updated metadata of a service to a network side, the UE generates a metadata index value corresponding to the updated metadata, and sends the updated metadata and the generated metadata index value to the network side; the network side determines, according to the received metadata index value, a code word corresponding to the service, and sends the generated code word to the UE; the UE broadcasts the received code word and the generated metadata index value. The technical solution can be used to solve a problem that when service data is updated, a monitoring UE cannot accurately and effectively obtain updated service data provided by an announcing UE.

Embodiment 5

Figure 9:
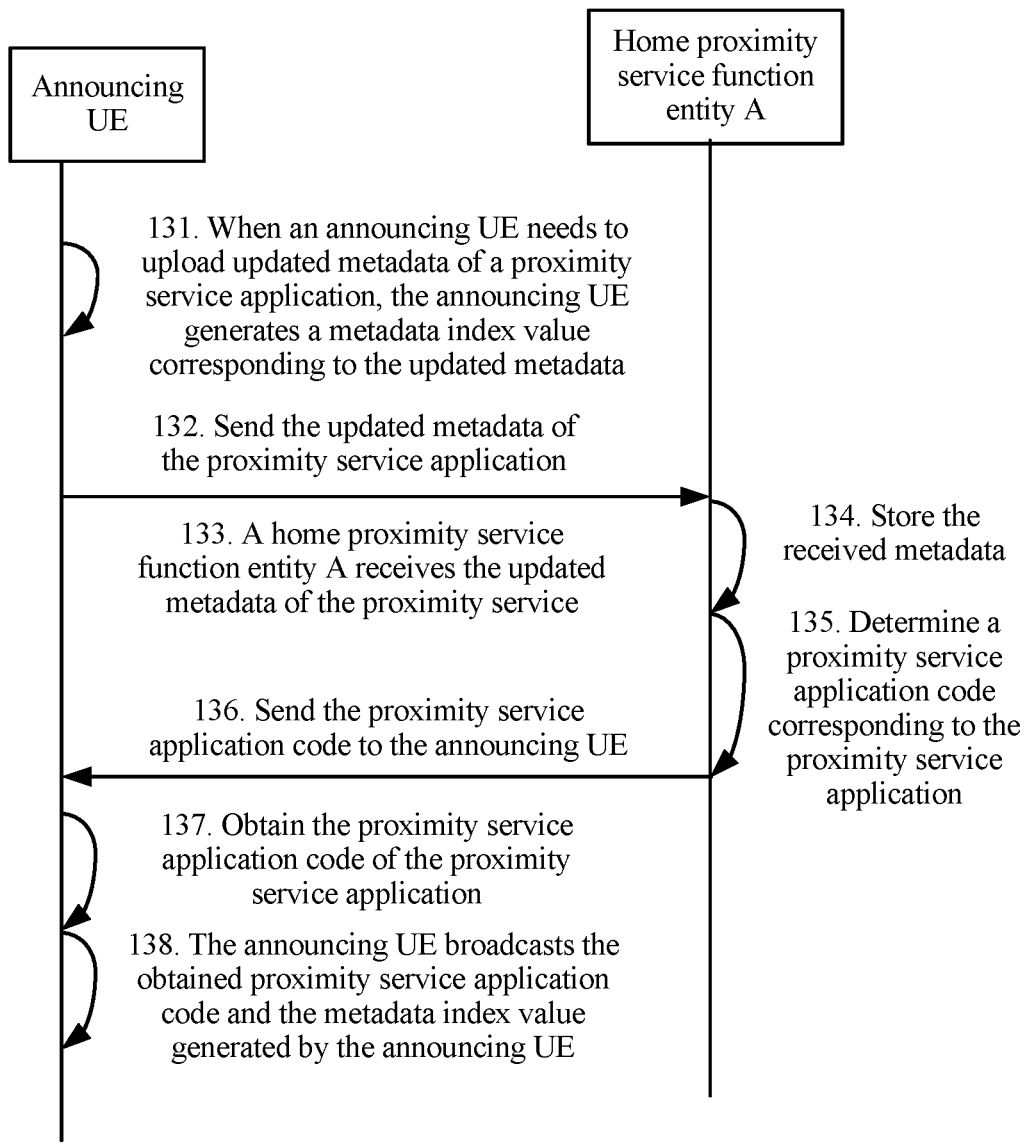
FIG. 9 is a flowchart of a data processing method according to Embodiment 5 of the present disclosure.

Embodiment 5 of the present disclosure provides a data processing method. As shown in FIG. 9, a specific processing procedure of the method includes the following steps.

Step 131: When an announcing UE needs to upload updated metadata of a proximity service application, the announcing UE generates a metadata index value corresponding to the updated metadata.

The announcing UE generates, according to the following specific procedure, the metadata index corresponding to the updated metadata:

Step 1: The announcing UE determines whether a metadata index exists in a ProSe application code. If a determining result is yes, performs step 2, or if a determining result is no, performs step 3.

Step 2: Update the existing metadata index. For example, by adding a specified numeric value, the metadata index corresponding to the updated metadata is generated.

1 may be added to the specified numeric value in sequence, or the specified numeric value may be another numeric value such as 2 or 3, or may be a randomly generated numeric value or a set numeric value.

Step 3: If a determining result is no, the announcing UE generates the metadata index.

Step 132: The announcing UE sends, to a home ProSe function A that provides services for the announcing UE, the updated metadata of the proximity service application.

In an implementation manner, the announcing UE may send a first request message, where the first request message is used for metadata updating. The first request message includes the updated metadata.

In an implementation manner, the announcing UE may send a second request message, where the second request message is used to request to obtain a code word for broadcasting. The second request message includes the updated metadata.

The first request message and the second request message may be implemented by using a same message, or may be implemented by using different messages.

In specific implementation, in a proximity service, the first request message and the second request message may be implemented by using a discovery request.

If the first request message is implemented by using the discovery request, that is, the discovery request is used for metadata updating, a command field command in the discovery request may be set to metadata-update or null, for indicating that the first request message is used for metadata updating.

If the second request message is implemented by using the discovery request, that is, the discovery request is used to request a code word for broadcasting (for example, a ProSe application code), the command field command in the discovery request may be set to announce, for indicating that the second request message is used to request to obtain a code word for broadcasting (for example, a ProSe application code).

The discovery request may further include a ProSe application ID, an identity of the announcing UE, a service application ID triggering the proximity service application, and the like. In the technical solution provided by Embodiment 5 of the present disclosure, the code word for broadcasting may be a ProSe application code in the proximity service.

In this embodiment, a sequence between step 131 in which the announcing UE generates the metadata index value and step 132 in which the announcing UE sends the metadata is not limited. The announcing UE may generate the metadata index value after successfully sending the metadata to the home ProSe function A.

Step 133: The home ProSe function A receives the updated metadata of the proximity service that is sent by the announcing UE.

In an implementation manner, the home ProSe function A may receive the first request message sent by the announcing UE, where the first request message includes the updated metadata and the generated metadata index.

In an implementation manner, the home ProSe function A may receive the second request message sent by the announcing UE, where the second request message includes the updated metadata and the generated metadata index.

For the first request message and the second request message, reference may be made to detailed descriptions in the foregoing step, and details are not further described in this step.

In specific implementation, the home ProSe function A receives the discovery request sent by the announcing UE. The discovery request includes the updated metadata.

Step 134: The home ProSe function A stores the received metadata.

Step 135: The home ProSe function A determines a ProSe application code corresponding to the proximity service application.

In an implementation manner, the first request message is used for metadata updating. Indication information for metadata updating may be included in the first request message to indicate that the first request message is used for metadata updating. The home ProSe function A obtains a ProSe application code stored in the UE context and corresponding to the proximity service application, and allocates, to the UE, a ProSe application code same as the obtained stored ProSe application code corresponding to the proximity service application.

In this manner, the home ProSe function A receives the discovery request, and determines, according to a command field value in the discovery request, that the request message is used for metadata updating. That is, if the command field value is metadata-update or the command field is set to null, it represents an indication for metadata updating, and is used to indicate that the first request message is used for metadata updating. The home ProSe function A obtains the stored ProSe application code corresponding to the proximity service application, and allocates, to the UE, the ProSe application code same as the stored ProSe application code corresponding to the proximity service application.

In an implementation manner, the second request message sent by the announcing UE is received, where the second request message is used to request to obtain a code word for broadcasting (for example, the ProSe application code provided by Embodiment 1 of the present disclosure). The home ProSe function A allocates a corresponding ProSe application code to the service application according to the second request message.

If the second request message is implemented by using the discovery request, in this manner, the home ProSe function A may determine, according to the command field value in the discovery request, that the request message is used to obtain a ProSe application code for broadcasting. That is, if the command field value is announce, which is used to indicate that the second request message is used to obtain a ProSe application code for broadcasting, the home ProSe function A allocates a new ProSe application code to the proximity service application of the announcing UE.

Step 136: The home ProSe function A sends the ProSe application code to the announcing UE.

In an implementation manner, the home ProSe function A sends a first response message, where the first response message includes the ProSe application code of the proximity service application.

In an implementation manner, the home ProSe function A sends a second response message, where the second response message includes the ProSe application code of the proximity service application.

The first response message and the second response message may be implemented by using a same message, or may be implemented by using different messages. The first response message corresponds to the foregoing first request message, and the second response message corresponds to the foregoing second request message.

In the technical solution provided by the embodiment of the present disclosure, the first response message or the second response message may be implemented by using a discovery response. In specific implementation, the home ProSe function A sends a discovery response, where the discovery response includes the ProSe application code of the proximity service application and a validity timer corresponding to the ProSe application code.

Step 137: The announcing UE obtains the ProSe application code of the proximity service application.

In an implementation manner, the announcing UE receives the first response message, and obtains the ProSe application code of the proximity service application from the first response message.

In this manner, the ProSe application code of the proximity service application is the ProSe application code sent by the home ProSe function A to the announcing UE according to the received first request message and is the same as the stored ProSe application code.

In an implementation manner, the announcing UE receives the second response message, and obtains the ProSe application code of the proximity service application from the received second response message, where the ProSe application code is the new ProSe application code allocated by the home ProSe function A to the proximity service application.

Step 138: The announcing UE broadcasts the obtained ProSe application code and the metadata index value generated by the announcing UE.

A message broadcast by the announcing UE includes the obtained ProSe application code and the metadata index value generated by the announcing UE.

Correspondingly, Embodiment 5 of the present disclosure provides a data processing method. A specific processing procedure of the method is as follows:

Step 1: When a user equipment UE needs to update metadata, the UE sends updated metadata; the UE generates a metadata index value corresponding to the updated metadata.

Step 2: Obtain a code word for broadcasting.

Step 3: Broadcast the obtained code word and the generated metadata index value.

Figure 10:
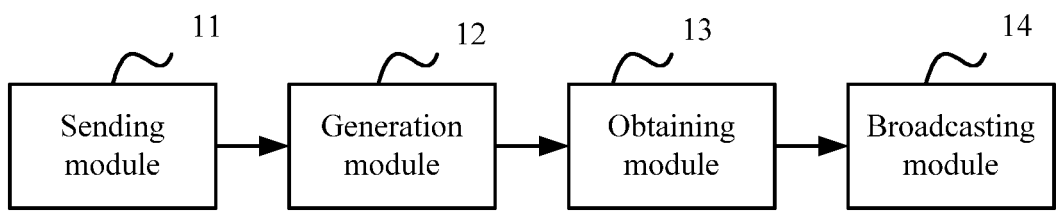
FIG. 10 is a schematic structural diagram of a data processing apparatus according to Embodiment 5 of the present disclosure.

Correspondingly, the embodiment of the present disclosure provides a data processing apparatus, as shown in FIG. 10, including: a sending module 11, configured to send updated metadata if metadata needs to be updated; a generation module 12, configured to generate a metadata index value corresponding to the updated metadata; an obtaining module 13, configured to obtain a code word for broadcasting; and a broadcasting module 14, configured to broadcast the obtained code word and the generated metadata index value.

Correspondingly, the embodiment of the present disclosure provides a data processing device whose structure is consistent with that in FIG. 2b. The data processing device includes: an interface, configured to send updated metadata if metadata needs to be updated; a memory, configured to store program code; and a signal processor, configured to generate, according to the program code stored in the memory, a metadata index value corresponding to the updated metadata, and configured to obtain a code word for broadcasting; where the interface is further configured to broadcast the obtained code word and the generated metadata index value.

In the foregoing technical solution provided by Embodiment 5 of the present disclosure, when a UE needs to send updated metadata of a service to a network side, the UE generates a metadata index value corresponding to the updated metadata, and sends the updated metadata to the network side; the network side determines a code word corresponding to the service, and sends the code word to the UE; the UE broadcasts the received code word and the generated metadata index value. The technical solution can be used to solve a problem that when service data is updated, a monitoring UE cannot accurately and effectively obtain updated service data provided by an announcing UE.

Embodiment 6

Figure 11A:
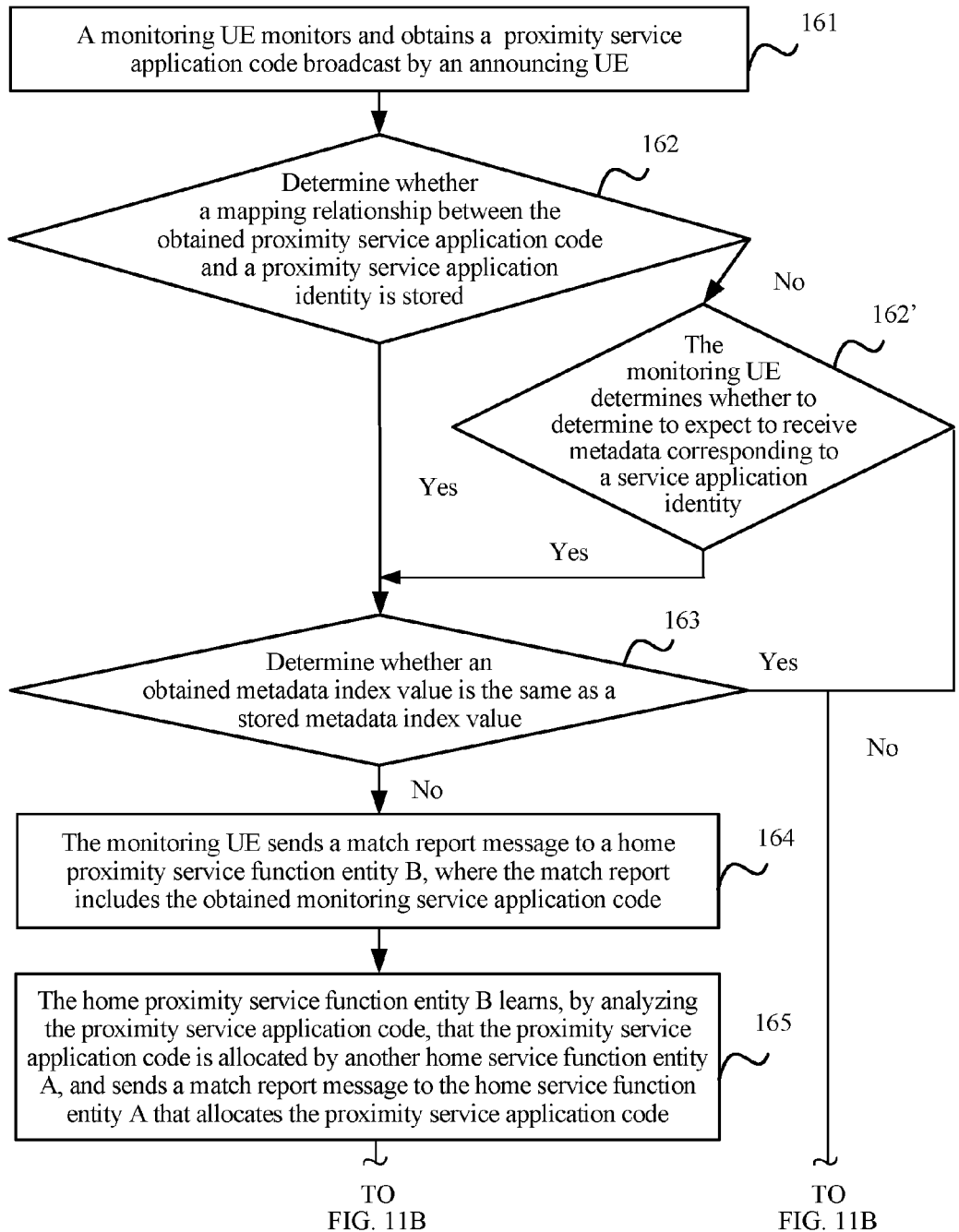
FIG. 11A and FIG. 11B are a flowchart of a data processing method according to Embodiment 6 of the present disclosure.
Figure 11B:
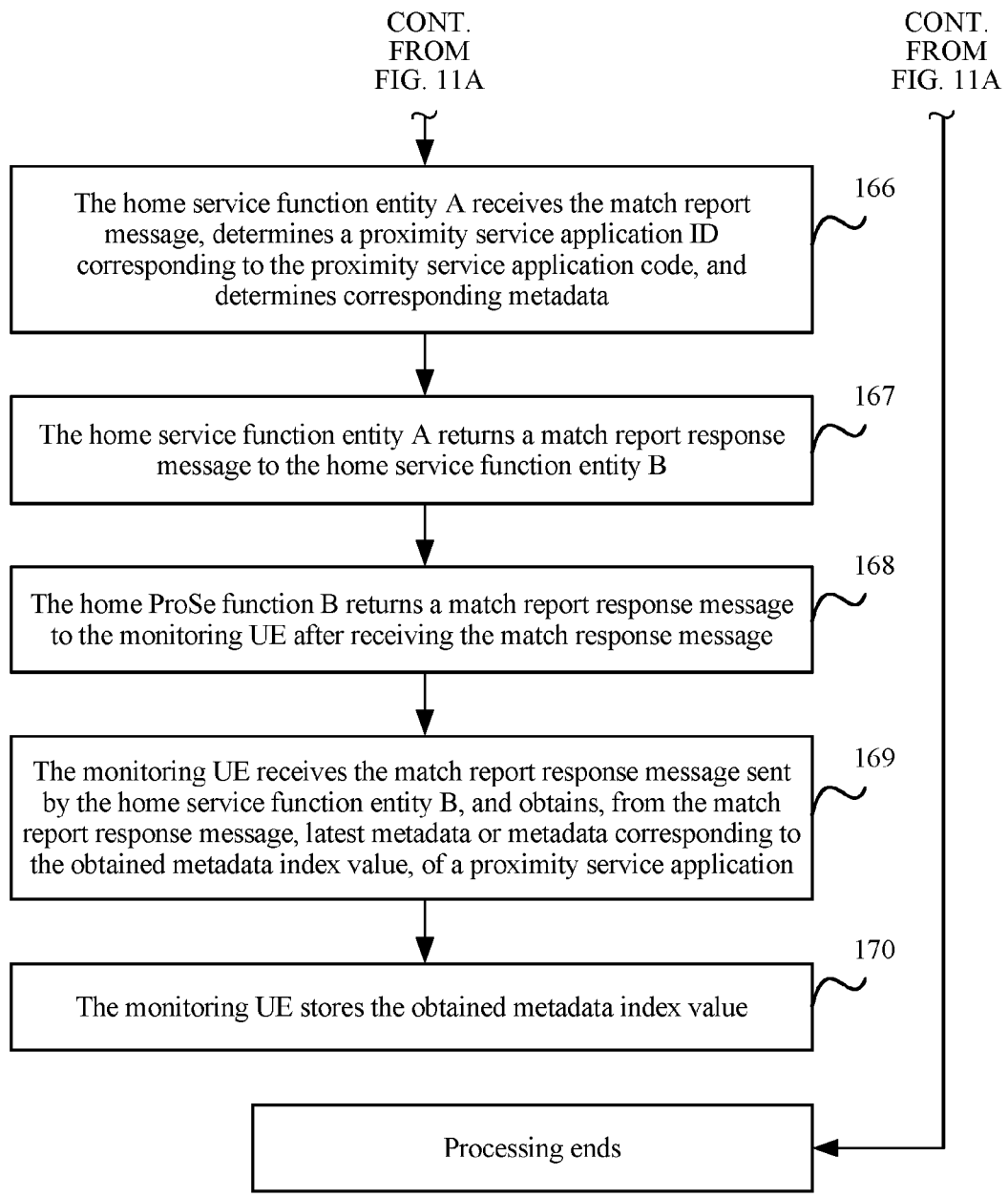

Embodiment 6 of the present disclosure provides a data processing method. As shown in FIG. 11A and FIG. 11B, a specific processing procedure of the method is as follows.

Step 161: A monitoring UE monitors and obtains a ProSe application code broadcast by an announcing UE.

Step 162: The monitoring UE determines whether a mapping relationship between the obtained ProSe application code and a ProSe application ID is stored; if a determining result is yes, performs step 163; otherwise, performs step 162'.

If the determining result is yes, it indicates that the ProSe application code obtained by the monitoring UE by monitoring is a discovered ProSe application code.

Step 162': The monitoring UE determines whether to determine to expect to receive metadata corresponding to a service application identity; if a determining result is yes, performs step 163; otherwise, the processing ends.

Step 163: When the monitoring UE determines that the mapping relationship between the obtained ProSe application code and the ProSe application ID is stored, the monitoring UE determines whether an obtained metadata index is the same as a stored metadata index; if a determining result is no, performs step 164; otherwise, the processing ends.

Step 164: The monitoring UE sends a match report message to a home ProSe function B of the monitoring UE, where the match report includes the obtained ProSe application code.

Optionally, the match report further includes the obtained metadata index value.

Step 165: The home ProSe function B learns, by analyzing the ProSe application code, that the ProSe application code is allocated by a home ProSe function A, and sends a match report message to the home ProSe function A that allocates the ProSe application code.

Step 166: The home ProSe function A receives the match report message, determines a ProSe application ID corresponding to the ProSe application code, and determines metadata corresponding to the ProSe application ID.

Further, if the received match report includes a metadata index value, in this step, the home ProSe function A determines, according to the metadata index value, metadata of a proximity service application corresponding to the ProSe application ID.

Step 167: The home ProSe function A returns a match report response message to the home ProSe function B.

The match report response message includes the ProSe application ID determined in step 166, and the determined metadata.

Step 168: After receiving the match response message, the home ProSe function B returns a match report response message to the monitoring UE.

The match response message includes the ProSe application ID and the metadata that are received in the match report response message in step 167.

Step 169: The monitoring UE receives the match report response message sent by the home ProSe function B, and obtains, from the match report response message, latest metadata or metadata corresponding to the obtained metadata index value, of a proximity service application.

Step 170: The monitoring UE stores the obtained metadata index.

The embodiment of the present disclosure provides a data processing method. A specific processing procedure of the method is as follows:

Step 1: A UE monitors and obtains a code word and a metadata index value.

Step 2: When determining that the obtained code word is a discovered code word, the UE determines whether the obtained metadata index value is the same as a stored metadata index value.

Step 3: If the obtained metadata index value is different from the stored metadata index value, the UE sends a match report message, where the match report message includes the metadata index value.

Step 4: The UE receives a match report response message, and obtains, from the match report response message, metadata corresponding to the metadata index.

Optionally, the method further includes: the UE stores the obtained metadata index value.

Figure 12:
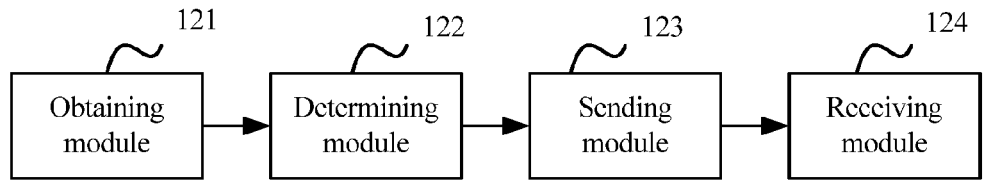
FIG. 12 is a schematic structural diagram of a data processing apparatus according to Embodiment 6 of the present disclosure.

Correspondingly, the embodiment of the present disclosure further provides a data processing apparatus, as shown in FIG. 12, including: an obtaining module 121, configured to monitor and obtain a code word and a metadata index value; a determining module 122, configured to determine, when determining that the obtained code word is a discovered code word, whether the obtained metadata index value is the same as a stored metadata index value; a sending module 123, configured for the UE to send a match report message if the obtained metadata index value is different from the stored metadata index value, where the match report message includes the metadata index value; and a receiving module 124, configured to receive a match report response message; where the obtaining module 121 is further configured to obtain, from the match report response message, metadata corresponding to the metadata index value.

Optionally, the apparatus may further include: a storage module, configured to store the obtained metadata index value.

Correspondingly, the embodiment of the present disclosure further provides a data processing device whose structure is consistent with that in FIG. 2b. The data processing device includes: a memory, configured to store program code; a signal processor, configured to monitor and obtain a code word and a metadata index value according to the program code stored in the memory, and when determining that the obtained code word is a discovered code word, determine whether the obtained metadata index value is the same as a stored metadata index value; and an interface, configured for the UE to send a match report message if the obtained metadata index value is different from the stored metadata index value, where the match report message includes the metadata index value; and receive a match report response message; where the signal processor is further configured to obtain, from the match report response message, metadata corresponding to the metadata index value.

Optionally, the memory is further configured to store the obtained metadata index value.

Correspondingly, Embodiment 6 of the present disclosure further provides a data processing method, including the following steps.

Step 1: A UE monitors and obtains a code word.

Step 2: When determining that the obtained code word is a discovered code word, the UE determines whether an obtained metadata index value is the same as a stored metadata index value.

The UE determines whether a mapping relationship between the obtained code word and a proximity service application identity ProSe application ID is stored, and if a determining result is yes, the UE determines that the obtained code word is the discovered code word.

Step 3: If the obtained metadata index value is different from the stored metadata index value, the UE sends a match report message, where the match report message includes the obtained code word.

Step 4: The UE receives a match report response message.

Step 5: The UE obtains, from the match report response message, a ProSe application ID corresponding to the code word and metadata corresponding to the ProSe application ID, or obtains a ProSe application ID corresponding to the code word and metadata corresponding to the metadata index value, of a proximity service application.

Correspondingly, Embodiment 6 of the present disclosure further provides a data processing apparatus whose structure is shown in FIG. 12. The data processing apparatus includes: an obtaining module, configured to monitor and obtain a code word; a determining module, configured to determine, when determining that the obtained code word is a discovered code word, whether an obtained metadata index value is the same as a stored metadata index value; where specifically, the determining module is specifically configured to determine whether a mapping relationship between the obtained code word and a proximity service application identity ProSe application ID is stored, and if a determining result is yes, determine that the obtained code word is the discovered code word; a sending module, configured for the UE to send a match report message if the obtained metadata index value is different from the stored metadata index value, where the match report message includes the obtained code word; and a receiving module, configured to receive a match report response message.

The obtaining module is configured to obtain, from the match report response message, the ProSe application ID corresponding to the code word and metadata corresponding to the ProSe application ID, or obtain the ProSe application ID corresponding to the code word and metadata corresponding to the metadata index value, of a proximity service application.

Correspondingly, Embodiment 6 of the present disclosure further provides a data processing device whose structure is shown in FIG. 2b. The data processing device includes: a signal processor, configured to monitor and obtain a code word, and when determining that the obtained code word is a discovered code word, determine whether an obtained metadata index value is the same as a stored metadata index value, and if the obtained metadata index value is different from the stored metadata index value, send a match report message by using an interface, where the match report message includes the obtained code word; the interface, configured to receive a match report response message; and a memory, configured to store the code word, a ProSe application ID, and metadata; where the signal processor is configured to obtain, from the match report response message according to a processing program stored in the memory, a ProSe application ID corresponding to the code word and metadata corresponding to the ProSe application ID, or obtain a ProSe application ID corresponding to the code word and metadata corresponding to the metadata index value, of a proximity service application.

Specifically, the signal processor is specifically configured to determine whether a mapping relationship between the obtained code word and the proximity service application identity ProSe application ID is stored, and if a determining result is yes, determine, by the UE, that the obtained code word is the discovered code word.

Embodiment 7

Figure 13A:
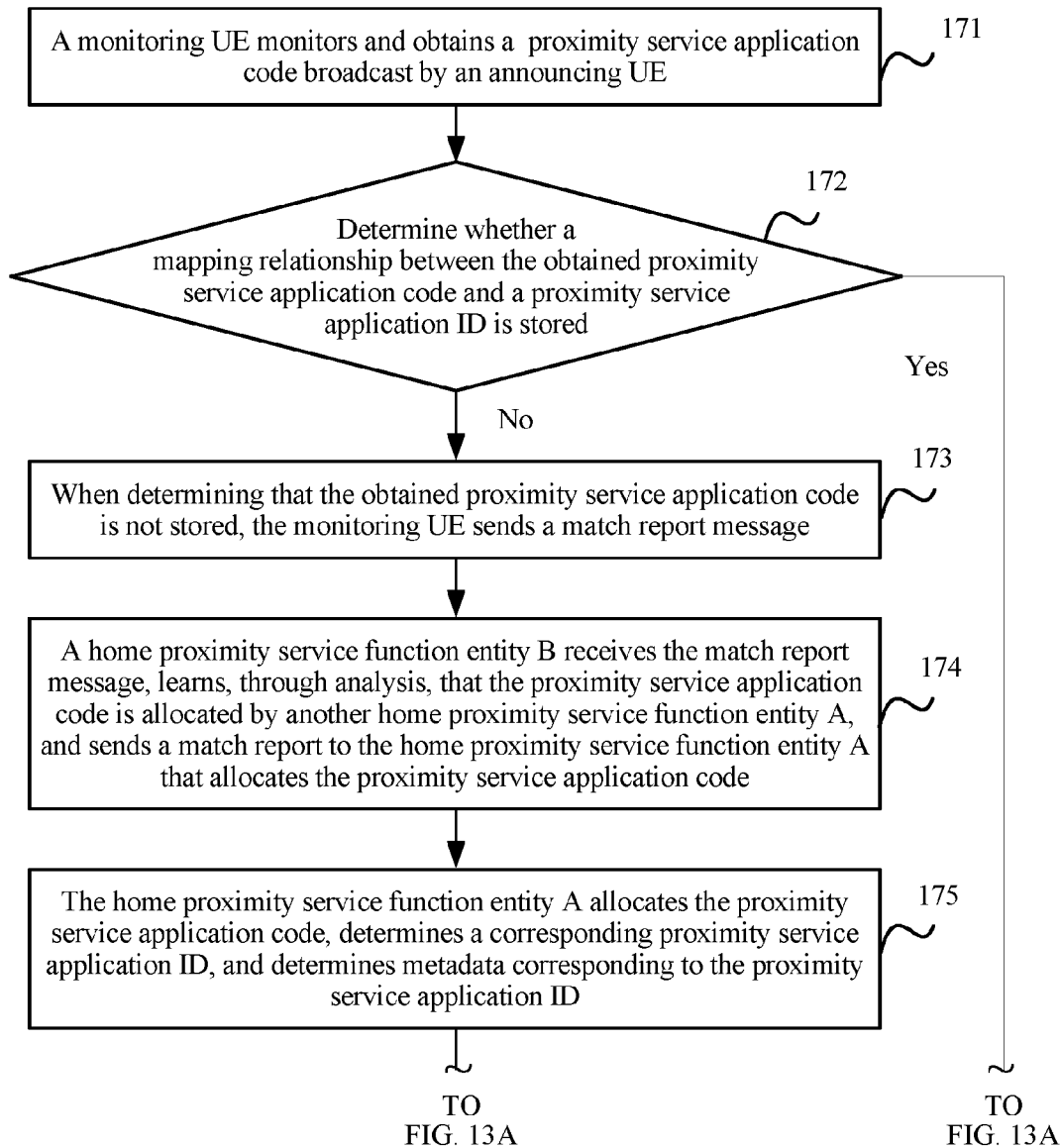
FIG. 13A and FIG. 13B are a flowchart of a data processing method according to Embodiment 7 of the present disclosure.
Figure 13B:
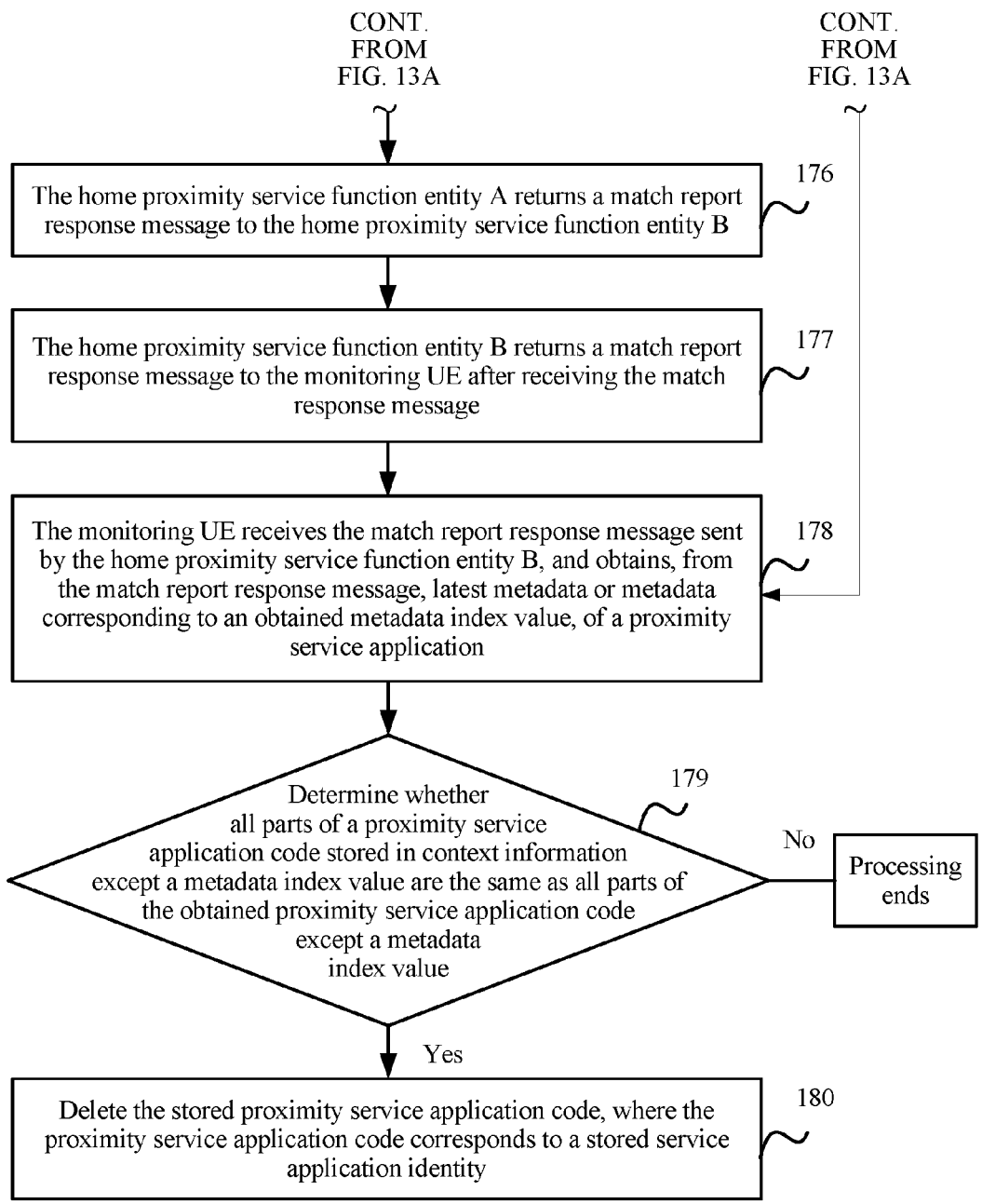

Embodiment 7 of the present disclosure provides a data processing method. As shown in FIG. 13A and FIG. 13B, a specific processing procedure of the method is as follows.

Step 171: A monitoring UE monitors and obtains a ProSe application code broadcast by an announcing UE.

Step 172: The monitoring UE determines whether a mapping relationship between the obtained ProSe application code and a ProSe application ID is stored; if a determining result is no, performs step 173; otherwise, performs step 178.

Step 173: When the monitoring UE determines that no service application identity corresponding to the obtained ProSe application code is stored, the UE sends a match report message.

The match report message includes the obtained ProSe application code. Optionally, the match report further includes an obtained metadata index value.

Step 174: A home ProSe function B receives the match report message, learns, by analyzing the ProSe application code, that the ProSe application code is allocated by a home ProSe function A, and sends a match report to the home ProSe function A that allocates the ProSe application code.

Step 175: The home ProSe function A allocates the ProSe application code, determines a ProSe application ID corresponding to the ProSe application code, and determines metadata corresponding to the ProSe application ID.

Further, if the received match report includes a metadata index value, in this step, the home ProSe function A determines, according to the metadata index value, corresponding metadata of a proximity service application.

Step 176: The home ProSe function A returns a match report response message to the home ProSe function B.

The match report response message includes the determined ProSe application ID and the determined metadata.

Step 177: After receiving the match response message, the home ProSe function B returns a match report response message to the monitoring UE.

The match response message includes the ProSe application ID and the metadata that are received in the match report response message.

Step 178: The monitoring UE receives the match report response message sent by the home ProSe function B, and obtains, from the match report response message, latest metadata or metadata corresponding to an obtained metadata index value, of a proximity service application.

Step 179: The monitoring UE determines whether all pails of a ProSe application code stored in context information except a metadata index value are the same as all parts of the obtained ProSe application code except a metadata index value. If a determining result is yes, performs step 180; otherwise, the processing ends.

Step 180: If a determining result is yes, delete the stored ProSe application code, where the ProSe application code corresponds to a stored service application identity.

The embodiment of the present disclosure provides a data processing method, including:

Step 1: A UE monitors and obtains a first code word of a proximity service.

Step 2: Determine whether a second code word is stored, where all parts of the second code word except a metadata index value are the same as all parts of the first code word except a metadata index value.

Step 3: If a determining result is yes, delete the second code word and a stored service application identity corresponding to the second code word.

Figure 14:
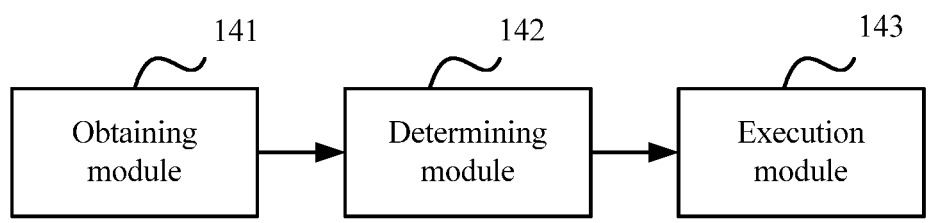
FIG. 14 is a schematic structural diagram of a data processing apparatus according to Embodiment 7 of the present disclosure.

Correspondingly, the embodiment of the present disclosure further provides a data processing apparatus, as shown in FIG. 14, including: an obtaining module 141, configured to monitor and obtain a first code word of a proximity service; a determining module 142, configured to determine whether a second code word is stored, where all parts of the second code word except a metadata index value are the same as all parts of the first code word except a metadata index value; and an execution module 143, configured to delete, if a determining result is yes, the second code word and a stored service application identity corresponding to the second code word.

Correspondingly, the embodiment of the present disclosure further provides a data processing device whose schematic structure is shown in FIG. 2b. The data processing device includes: a memory, configured to store program code; and a signal processor, configured to obtain the program code stored in the memory, and monitor and obtain a first code word of a proximity service according to the program code; and configured to determine whether a second code word is stored, where all parts of the second code word except a metadata index value are the same as all parts of the first code word except a metadata index value; and if a determining result is yes, delete the second code word and a stored service application identity corresponding to the second code word.

Embodiment 8

Figure 15A:
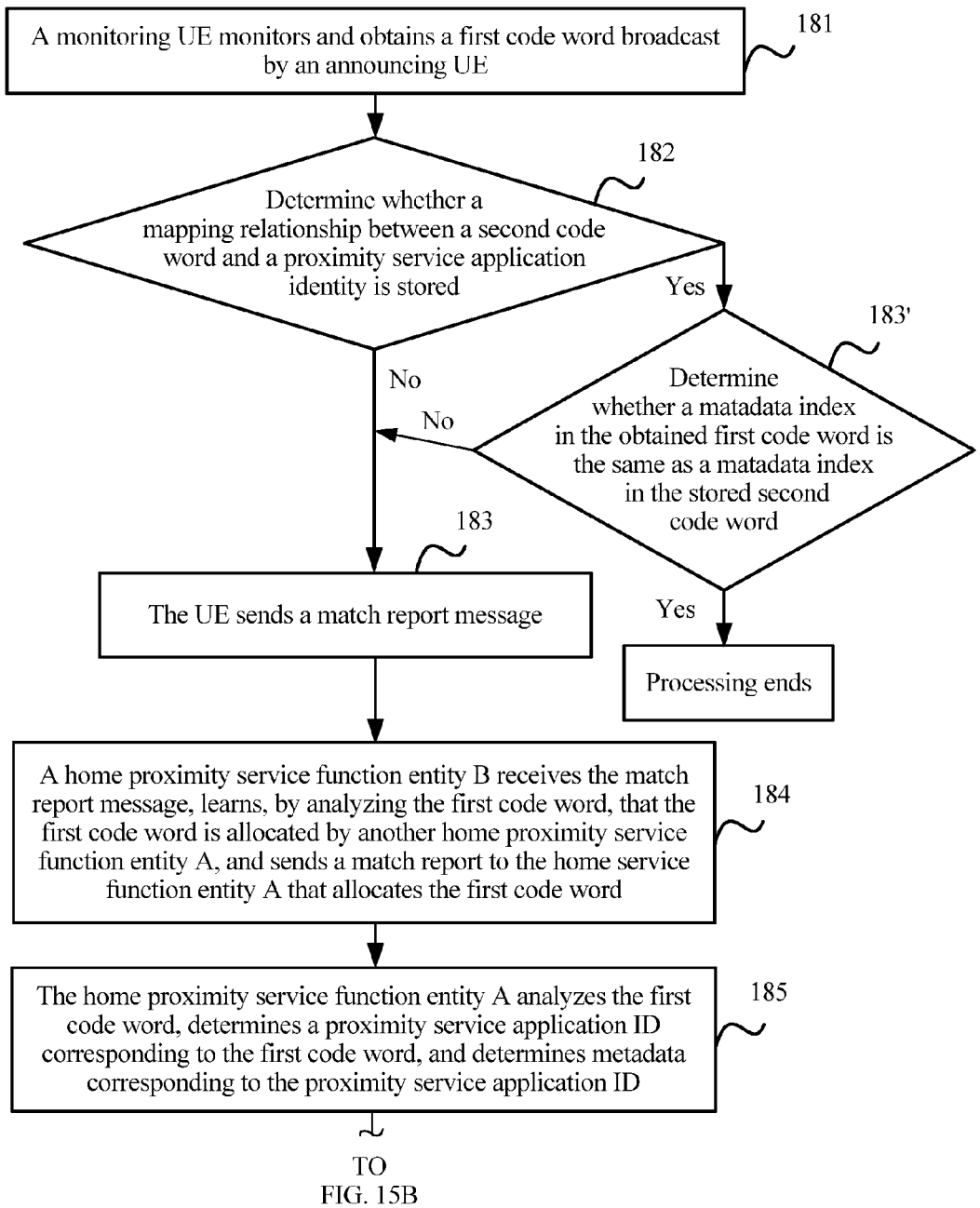
FIG. 15A and FIG. 15B are a flowchart of a data processing method according to Embodiment 8 of the present disclosure.
Figure 15B:
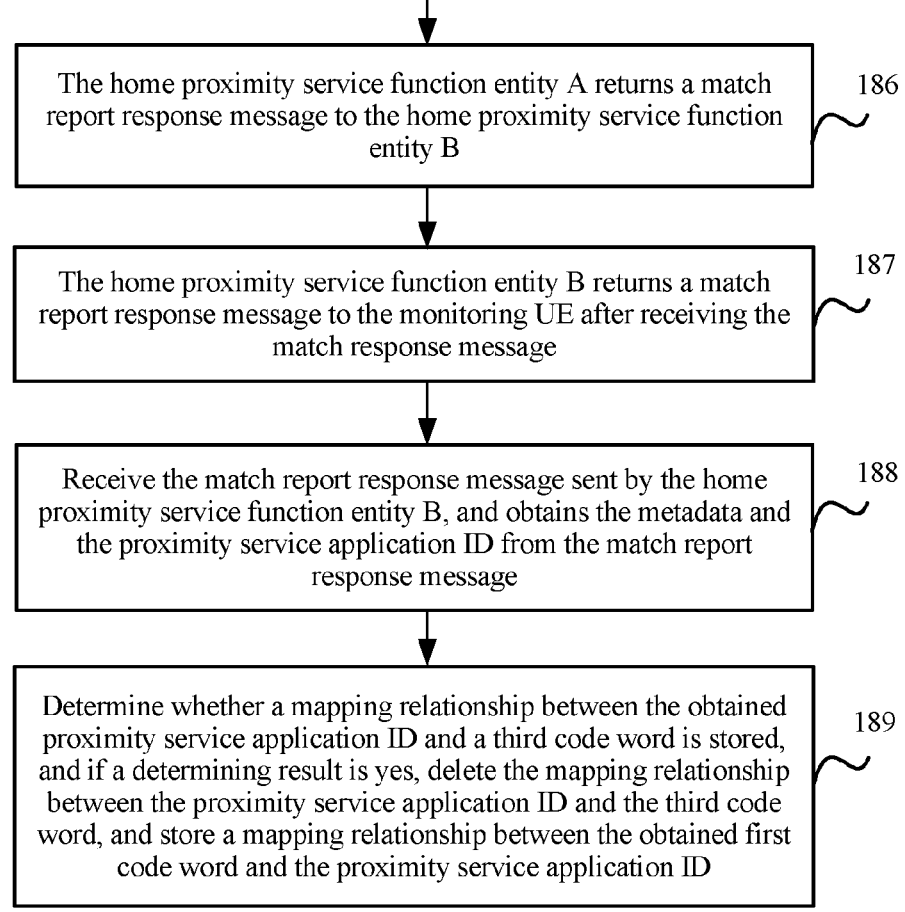

Embodiment 8 of the present disclosure provides a data processing method. As shown in FIG. 15A and FIG. 15B, a specific processing procedure of the method is as follows.

Step 181: A monitoring UE monitors and obtains a first code word broadcast by an announcing UE.

The first code word may be a first ProSe application code.

Step 182: The monitoring UE determines whether a mapping relationship between a second code word and a ProSe application ID is stored; if a determining result is no, performs step 183; otherwise, performs step 183'.

The stored second code word is a code word in which all parts except a metadata index value metadata index are the same as all parts of the obtained first code word except a metadata index value.

The second code word may be a second ProSe application code.

Step 183': Determine whether a metadata index in the obtained first code word is the same as a metadata index in the stored second code word; if a determining result is no, performs step 183; otherwise, the processing ends.

Step 183: The UE sends a match report message.

The match report message includes the obtained first code word.

The metadata index in the obtained first code word is different from the metadata index in the stored second code word, that is, in this case, the first code word and the second code word are different code words.

Step 184: A home ProSe function B receives the match report message, learns, by analyzing the first code word, that the first code word is allocated by a home ProSe function A, and sends a match report to the home ProSe function A that allocates the first code word.

Step 185: The home ProSe function A analyzes the first code word, determines a ProSe application ID corresponding to the first code word, and determines metadata corresponding to the ProSe application ID.

Step 186: The home ProSe function A returns a match report response message to the home ProSe function B.

The match report response message includes the determined ProSe application ID and the determined metadata corresponding to the ProSe application ID.

Step 187: The home ProSe function B returns a match report response message to the monitoring UE after receiving the match report response message.

The match response message includes the determined ProSe application ID and the determined metadata corresponding to the ProSe application ID.

Step 188: The monitoring UE receives the match report response message sent by the home ProSe function B, and obtains the metadata and the ProSe application ID from the match report response message.

Step 189: The monitoring UE determines whether a mapping relationship between the obtained ProSe application ID and a third code word is stored, and if a determining result is yes, deletes the mapping relationship between the ProSe application ID and the third code word, and stores a mapping relationship between the obtained first code word and the ProSe application ID.

The third code word is a code word having a mapping relationship with the ProSe application ID. The third code word may be the foregoing second code word, or the third code word may be the foregoing first code word.

Specifically, the monitoring UE may determine whether the obtained ProSe application ID is stored, where the ProSe application ID corresponds to the third code word, and therefore determine that the mapping relationship between the ProSe application ID and the third code word is stored. Further, the monitoring UE deletes the stored third code word, and stores the first code word monitored and obtained in step 181 and the ProSe application ID correspondingly. Therefore, the mapping relationship between the ProSe application ID and the third code word is deleted, and the mapping relationship between the obtained first code word and the ProSe application ID is stored.

Alternatively, step 189 may also be implemented in the following manner.

Firstly, the monitoring UE determines whether the second code word is stored, where the second code word corresponds to the ProSe application ID.

In the stored second code word, all parts except the metadata index value metadata index are the same as all parts of the obtained first code word except the metadata index value.

Secondly, if a determining result is yes, the mapping relationship is deleted, and the correspondence between the first code word obtained in step 181 and the obtained ProSe application ID is stored. A new mapping relationship is formed between the first code word and the received ProSe application ID. Otherwise, the processing ends.

In specific implementation, if the determining result is yes, the monitoring UE may further replace the second code word with the first code word obtained in step 181, and therefore deletes the mapping relationship between the second code word and the ProSe application ID, and stores the mapping relationship between the obtained first code word and the ProSe application ID. Embodiment 8 of the present disclosure provides a data processing method, including:

Step 1: A UE monitors and obtains a first code word of a proximity service.

Step 2: The UE obtains a ProSe application ID corresponding to the first code word.

Step 3: The UE determines whether a mapping relationship between the ProSe application ID and a third code word is stored, and if a determining result is yes, deletes the mapping relationship between the ProSe application ID and the third code word.

Step 4: Store a mapping relationship between the obtained first code word and the ProSe application ID.

The third code word is the first code word or a second code word, where the second code word is a code word in which all parts except a metadata index value metadata index are the same as all parts of the obtained first code word except a metadata index value.

Figure 16:
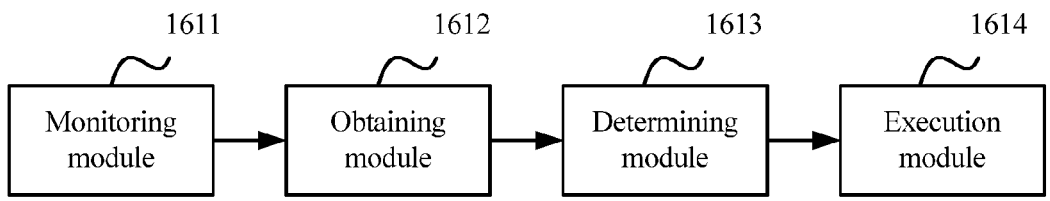
FIG. 16 is a schematic structural diagram of a data processing apparatus according to Embodiment 8 of the present disclosure.

Correspondingly, Embodiment 8 of the present disclosure further provides a data processing apparatus, as shown in FIG. 16, including: a monitoring module 1611, configured to monitor and obtain a first code word of a proximity service; an obtaining module 1612, configured to obtain a ProSe application ID corresponding to the first code word; a determining module 1613, configured to determine whether a mapping relationship between the ProSe application ID and a third code word is stored; and an execution module 1614, configured to: if a determining result is yes, delete the mapping relationship between the ProSe application ID and the third code word, and store a mapping relationship between the obtained first code word and the ProSe application ID; where the third code word includes a second code word, where the second code word is a code word in which all parts except a metadata index value metadata index are the same as all parts of the obtained first code word except a metadata index value.

Correspondingly, Embodiment 8 of the present disclosure further provides a data processing device whose structure is shown in FIG. 2b. The data processing device includes: a signal processor, configured to monitor and obtain a first code word of a proximity service by using an interface, obtain a ProSe application ID corresponding to the first code word, determine whether a mapping relationship between the ProSe application ID and a third code word is stored, and if a determining result is yes, delete the mapping relationship between the ProSe application ID and the third code word; and a memory, configured to store a mapping relationship between the obtained first code word and the ProSe application ID; where the third code word is the first code word or a second code word, where the second code word is a code word in which all parts except a metadata index value metadata index are the same as all parts of the obtained first code word except a metadata index value.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising: sending, by a user equipment (UE), a request message, wherein the request message comprises updated metadata; receiving, by the UE, a response message, wherein the response message comprises a code word, and wherein the code word comprises a metadata index value corresponding to the updated metadata; and broadcasting, by the UE, the obtained code word.

2. The method according to claim 1, wherein the request message is used for metadata updating.

3. The method according to claim 2, wherein the code word is generated by a network side after the network side generates the metadata index value according to the received updated metadata and replaces a metadata index value in a stored code word with the generated metadata index value.

4. The method according to claim 1, wherein the request message is used to request to obtain the code word for broadcasting.

5. The method according to claim 4, wherein the code word is generated by a network side using the metadata index value and a temporary identity after the network side generates the corresponding metadata index value according to the received updated metadata and allocates, to the UE, the temporary identity in the code word for broadcasting.

6. A method, comprising: receiving a request message from a user equipment (UE), wherein the request message comprises updated metadata; generating a metadata index value corresponding to the updated metadata; generating, using the metadata index value, a code word for broadcasting by the UE; and sending a response message, wherein the response message comprise the generated code word.

7. The method according to claim 6, wherein the request message is used for metadata updating.

8. The method according to claim 7, wherein generating, using the metadata index value, the code word for broadcasting by the UE comprises: obtaining a stored code word for broadcasting by the UE; and replacing a metadata index value in the obtained code word with the metadata index value.

9. The method according to claim 6, wherein the request message is used to request to obtain the code word for broadcasting.

10. The method according to claim 9, wherein generating, using the metadata index value, the code word for broadcasting by the UE comprises: allocating, to the UE, a temporary identity, and generating, by using the metadata index value and the temporary identity, the code word for broadcasting by the UE.

11. A device, comprising: a non-transitory memory storage comprising instructions; and one or more processors in communication with the memory, wherein the one or more processors execute the instructions to: receive a request message from a user equipment (UE), wherein the request message comprises updated metadata; generate a metadata index value corresponding to the updated metadata; generate, using the metadata index value, a code word for broadcasting by the UE; and send a response message, wherein the response message comprises the generated code word.

12. The device according to claim 11, wherein the request message is used for metadata updating.

13. The device according to claim 12, wherein the one or more processors further execute the instructions to: obtain a stored code word for broadcasting by the UE; and replace a metadata index value in the obtained code word with the metadata index value.

14. The device according to claim 11, wherein the request message is used to request to obtain the code word for broadcasting.

15. The device according to claim 14, wherein the one or more processors further execute the instructions to: allocate to the UE, a temporary identity, and generate, using the metadata index value and the temporary identity, the code word for broadcasting by the UE.

* * * * *